(12) United States Patent
Viswanath

(10) Patent No.: US 8,781,392 B2
(45) Date of Patent: Jul. 15, 2014

(54) WIRELESS COMMUNICATION INFORMATION RELAY

(75) Inventor: Pramod Viswanath, Urbania, IL (US)

(73) Assignee: QUALCOMM Incorporated, San Diego, CA (US)

(*) Notice: Subject to any disclaimer, the term of this patent is extended or adjusted under 35 U.S.C. 154(b) by 550 days.

(21) Appl. No.: 12/353,893

(22) Filed: Jan. 14, 2009

(65) Prior Publication Data

US 2009/0181666 A1  Jul. 16, 2009

Related U.S. Application Data

(60) Provisional application No. 61/021,537, filed on Jan. 16, 2008, provisional application No. 61/021,545, filed on Jan. 16, 2008.

(51) Int. Cl.
*H04B 7/15* (2006.01)

(52) U.S. Cl.
USPC .......... 455/11.1; 455/425; 455/436; 455/438; 370/338

(58) Field of Classification Search
USPC ........................................ 455/425, 438, 11.1
See application file for complete search history.

(56) References Cited

U.S. PATENT DOCUMENTS

| | | | |
|---|---|---|---|
| 6,473,617 B1 | 10/2002 | Larsen et al. | |
| 7,184,703 B1 | 2/2007 | Naden et al. | |
| 7,787,408 B2 | 8/2010 | Proctor, Jr. et al. | |
| 2004/0127225 A1* | 7/2004 | Qiu et al. | 455/450 |
| 2007/0110016 A1* | 5/2007 | Shen et al. | 370/338 |
| 2008/0107091 A1* | 5/2008 | Ramachandran | 370/338 |
| 2008/0192666 A1* | 8/2008 | Koskan et al. | 370/311 |
| 2009/0325622 A1 | 12/2009 | Matsumura et al. | |
| 2010/0248619 A1* | 9/2010 | Senarath et al. | 455/11.1 |

FOREIGN PATENT DOCUMENTS

| | | | |
|---|---|---|---|
| CN | 1554205 A | 12/2004 | |
| CN | 1965601 A | 5/2007 | |
| JP | 2001112043 A | 4/2001 | |
| JP | 2001357480 A | 12/2001 | |
| JP | 2003069580 A | 3/2003 | |
| JP | 2004229142 A | 8/2004 | |
| JP | 2004349872 A | 12/2004 | |
| JP | 2006501759 A | 1/2006 | |
| JP | 2006311282 A | 11/2006 | |
| JP | 2006352890 A | 12/2006 | |

(Continued)

OTHER PUBLICATIONS

Hongyi Wu et al: "Integrated Cellular and Ad Hoc Relaying Systems: iCAR" IEEE Journal on Selected Areas in Communications, IEEE Service Center, Piscataway, US, vol. 19, No. 10, Oct. 1, 2001, XP011055480 ISSN: 0733-8716 p. 2105, col. 2, lines 46-48 p. 2106, col. 1, line 1 p. 2106, col. 1, lines 8-11 p. 2107, col. 2, lines 24-29 p. 2110; figure 5.

(Continued)

*Primary Examiner* — Mazda Sabouri

(57) ABSTRACT

To improve operation in a wireless communication system, a relay can be used to assist in transferring information from a mobile device to a base station. Uplink and downlink communications can be monitored to determine if a mobile device is at an edge of a cell and if there should be assistance provided. If there should be assistance performed, then digital or analog relay operations can be implemented. Multiple packet transmissions can take place as well as a scaled version of a transmission can be transferred.

42 Claims, 20 Drawing Sheets

(56) References Cited

FOREIGN PATENT DOCUMENTS

| JP | 2007096988 | A | 4/2007 |
|---|---|---|---|
| JP | 2007184935 | A | 7/2007 |
| JP | 2009515463 | A | 4/2009 |
| RU | 2000116264 | A | 5/2002 |
| RU | 2005136867 | A | 5/2007 |
| WO | 9927747 | A1 | 6/1999 |
| WO | 2004107693 | A1 | 12/2004 |
| WO | WO2007055544 | | 5/2007 |

OTHER PUBLICATIONS

International Search Report & Written Opinion—PCT/US2009/031147, International Search Authority—European Patent Office—Jun. 5, 2009.

Relay Task Group of IEEE 802 16: "Part 16: Air Interface for Fixed and Mobile Broadband Wireless Access Systems Multihop Relay Specification" IEEE 802.16J Baseline Document, [Online] Apr. 10, 2007, XP002528412 Retrieved from the Internet: URL: www.i eee802.org/16/relay/docs/80216j-0 6_026r3.pdf> [retrieved on May 14, 2009] p. 54, lines 11-12 p. 54, lines 47-55.

Secretary: "3GPP TR 25.924: Opportunity Driven Multiple Access" 3GPP Draft; R2-99D54, 3rd Generation Partnership Project (3GPP), Mobile Competence Centre ; 650, Route Des Lucioles ; F-06921 Sophia-Antipolis Cedex ; France, No. CHEJU; Nov. 2, 1999, XP050113827 the whole document.

Woonsik Lee et al: "An Orthogonal Resource Allocation Algorithm to Improve the Performance of OFDMA-Based Cellular Wireless Systems Using Relays" Consumer Communications and Networking Conference, 2008. CCNC 2008. 5th IEEE, IEEE CCP, Piscataway, NJ, USA, Jan. 1, 2008, pp. 917-921, XP031212022 ISBN: 978-1-4244-1456-7 p. 917, col. 2, lines 9-11, p. 917, col. 2, lines 25,26 p. 918; figure 2 p. 918, col. 1, lines 1-3.

Masamune Okino, et al., "Proposal and Evaluation of a Selection Method of Relay Nodes for Wireless Flooding by Exchanging Neighbor Node Information," Proceedings of 2003 General Conference of the Institute of Electronics, Information and Communication Engineers, Communication 2, Mar. 3, 2003, p. 371.

"Draft Standard for Local and Metropolitan Area Networks—Part 16: Air Interface for Fixed and Mobile Broadband Wireless Access System—Multihop Relay Specification." IEEE Unapproved Draft Std P802. 16j/D1, Aug. 2007: vol., No., 2007.

Taiwan Search Report—TW098101434—TIPO—Feb. 5, 2012.

* cited by examiner

WIRELESS COMMUNICATION INFORMATION RELAY

CROSS-REFERENCE

The present Application for Patent claims priority to Provisional Application No. 61/021,537 entitled "APPARATUS AND METHOD TO FACILITATE IDENTIFICATION AND SUPPORT OF MOBILE TERMINALS WITHIN A NETWORK" filed on Jan. 16, 2008, and hereby expressly incorporated by reference herein.

The present Application for Patent claims priority to Provisional Application No. 61/021,545 entitled "APPARATUS AND METHOD TO FACILITATE IDENTIFICATION AND SUPPORT OF MOBILE TERMINALS WITHIN A NETWORK" filed on Jan. 16, 2008, and hereby expressly incorporated by reference herein.

BACKGROUND

1. Field

The following description relates generally to wireless communication and in particular to using at least one relay to aid in data transmission.

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

In a wireless communication network, multiple base stations are placed upon fixed locations to create a coverage area. Through use of a mobile device, a user can output information that transfers to a base station of the coverage area and is forwarded to an appropriate location (such as a mobile device of another user)—similarly, the user can collect information forwarded from the base station in a comparable manner. As the user and mobile device travel, there can be a breakdown in communication with a base stations (e.g., based upon a long physical distance between the base station and mobile device). Therefore, a handoff can occur where the mobile device transfers to a more suitable base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one aspect, there can be a method for determining if there should be assistance provided to a mobile device operable upon a wireless communication device. The method can include ascertaining if a relay is near an edge of a cell based upon evaluation of a downlink transmission. Moreover, the method can include determining if assistance should be provided by the relay to the mobile device based upon analysis of an uplink transmission and further based on the ascertaining of the relay being near the edge of the cell.

With another aspect, there can be an apparatus that incorporates a measurement module that ascertains if a relay is near an edge of a cell based upon evaluation of a downlink transmission. The apparatus can also incorporate an appraisal module that determines if assistance should be provided by the relay to the mobile device based upon analysis of an uplink transmission and further based on the ascertaining of the relay being near the edge of the cell.

In a further aspect, there can be at least one processor configured to determine if there should be assistance provided to a mobile device. The processor can use a first module for ascertaining if a relay is near an edge of a cell based upon evaluation of a downlink transmission. The processor can also use a second module for determining if assistance should be provided by the relay to the mobile device based upon analysis of an uplink transmission and further based on the ascertaining of the relay being near the edge of the cell.

Concerning one aspect, there can be a computer program product with a computer-readable medium. The medium can include a first set of codes for causing a computer to ascertain if a relay is near an edge of a cell based upon evaluation of a downlink transmission. Additionally, the medium can include a second set of codes for causing the computer to determine if assistance should be provided by the relay to the mobile device based upon analysis of an uplink transmission and further based on the ascertaining of the relay being near the edge of the cell.

In yet another aspect, there can be an apparatus with means for ascertaining if a relay is near an edge of a cell based upon evaluation of a downlink transmission. The apparatus can also have means for determining if assistance should be provided by the relay to the mobile device based upon analysis of an uplink transmission and further based on the ascertaining of the relay being near the edge of the cell.

According to one aspect, there can be a method for assisting communication of a mobile device operable upon a wireless communication device. The method can include identifying that a mobile device should be provided assistance based upon monitored uplink and downlink information. The method can also include instructing a relay to provide assistance to the mobile device upon identifying that assistance should be provided.

With another aspect, there can be an apparatus with a classifier module that identifies that a mobile device should be provided assistance based upon monitored uplink and downlink information. The apparatus can also be with a support module that instructs a relay to provide assistance to the mobile device upon identifying that assistance should be provided.

In a further aspect, there can be at least one processor configured to assist communication of a mobile device. The processor can configure with a first module for identifying that a mobile device should be provided assistance based upon monitored uplink and downlink information. The processor can also configure with a second module for instructing a relay to provide assistance to the mobile device upon identifying that assistance should be provided.

Concerning one aspect, there can be a computer program product with a computer-readable medium. The medium can incorporate a first set of codes for causing a computer to identify that a mobile device should be provided assistance based upon monitored uplink and downlink information. The medium can also incorporate a second set of codes for causing the computer to instruct a relay to provide assistance to the mobile device upon identifying that assistance should be provided.

In yet another aspect, there can be an apparatus with means for identifying that a mobile device should be provided assistance based upon monitored uplink and downlink information. The apparatus can also function with means for instructing a relay to provide assistance to the mobile device upon identifying that assistance should be provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
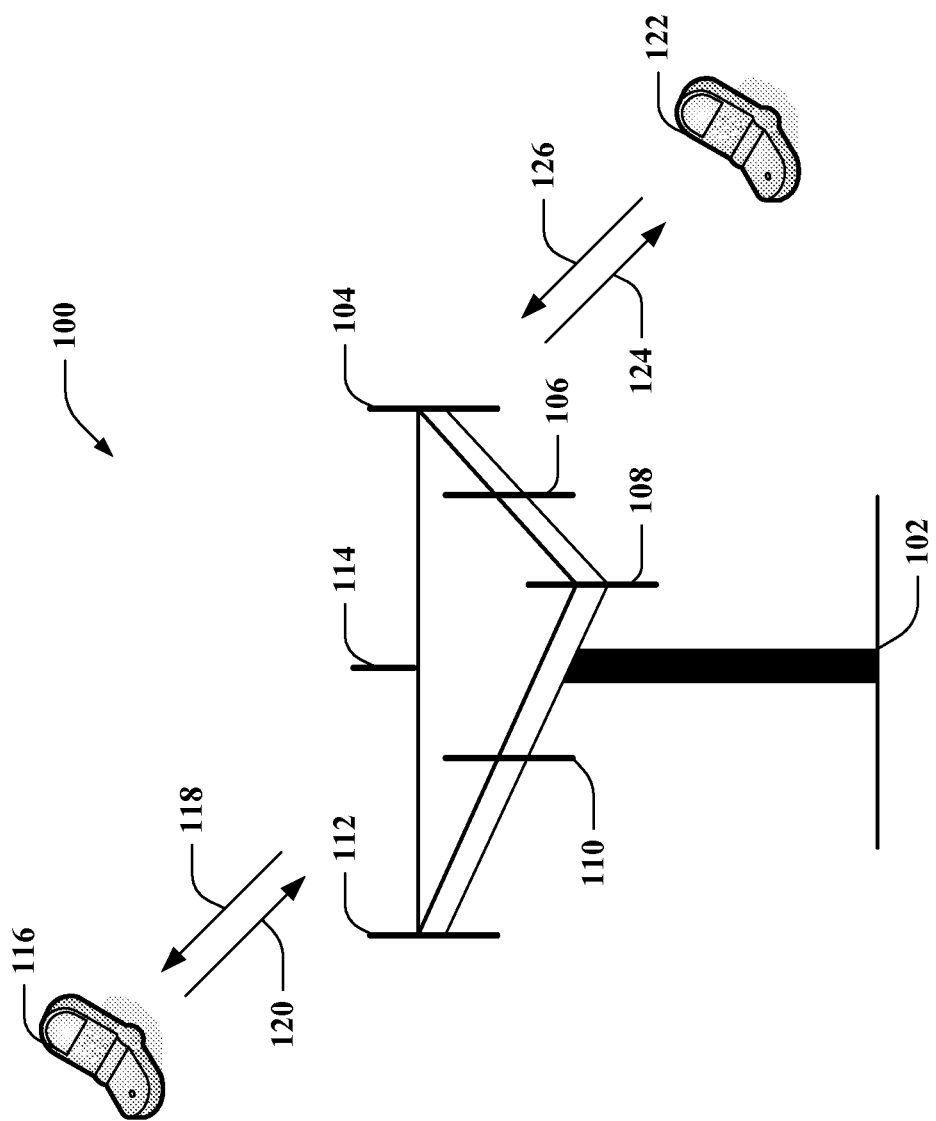
FIG. 1 illustrates a representative wireless communication system in accordance with at least one aspect disclosed herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. Metadata pertaining to an incoming communication (e.g., cellular call) can be displayed upon the mobile device. For instance, a number of minutes remaining on a 'pay as you go' telephone can be presented to a user.

As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

The set of antennas and/or the area in which they are designated to communicate can be referred to as a sector of base station 102. For example, multiple antennas can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. In addition, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Figure 2:
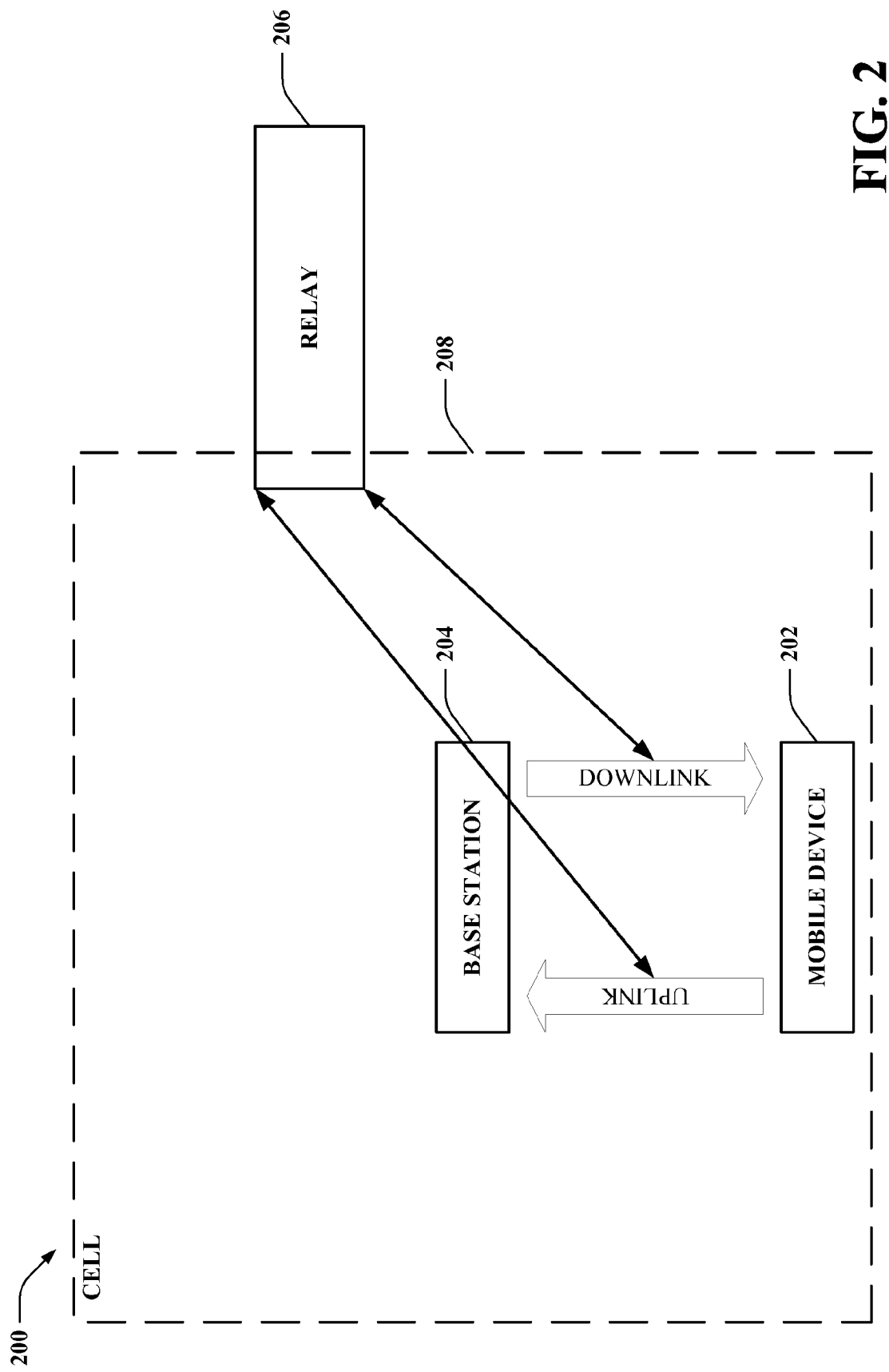
FIG. 2 illustrates a representative communication configuration in accordance with at least one aspect disclosed herein.

Referring now to FIG. 2, an example configuration 200 is disclosed for observing uplink and downlink transmission related to a mobile device 202 and determining if communication assistance should be provided to the mobile device (assisting in sending information (e.g., providing uplink support), collecting information (e.g., providing downlink support), or processing information). With an illustrative communication system, the mobile device 202 can transfer information to a base station 204 (e.g., as an uplink or reverse link)—conversely, the base station 206 can send information to the mobile device 202 (e.g., as a downlink or forward link), which can be forwarded from another location, such as a satellite, another base station, another mobile device, and the like.

There can be instances where there is limited coverage and thus resources are relatively scarce. Therefore, a relay 206 can be introduced for assisting the mobile device 202 in information communication by facilitating communication with the base station 204. The relay 206 can monitor pilots or beacons of the downlink and use a result of the monitoring to determine physical location of the relay 206 relative to the base station 204. Specifically, the relay 206 can determine if the physical location is at an edge of a cell 210 produced by the base station 204. According to one embodiment, the relay functions optimally (e.g., is of most benefit to the mobile device 202) when at the edge of the cell 210.

In addition to monitoring the downlink, the relay 206 can observe uplink transmissions. There can be evaluation of an observation result to determine if there is a mobile device that can be assist by the relay 206 (e.g., the mobile device 202) and to determine if assistance is appropriate (e.g., it is beneficial for the relay 206 and the mobile device 202 to engage in the assistance). For instance, a determination can be made on if there are mobile devices physically close enough to the relay to reap a benefit.

If it is determined that the relay 208 is at the edge and there is a mobile device for which it is appropriate to provide support, then support can be granted (e.g., digital support, analog support, etc.). For example, the mobile device 202 can attempt to send 4 MB of information to the base station 206. Without assistance, the mobile device can send four 1 MB packets in a serial manner. However, the assistance can enable the relay 206 to transmit first and third 1 MB packets serially to the base station 204 while the mobile device 202 transmits second and fourth 1 MB packets serially, thus resulting in the transfer occurring in less time. Likewise, the relay 206 can provide assistance in transmitting from the base station 204 to the mobile device 202. In another example, the mobile device 202 and relay 206 can attempt to send identical packets under an assumption that multiple tries are necessary to be successful. Thus, attempts can take place concurrently (e.g., the mobile device 202 and relay 206 transfer the packets simultaneously increasing exposure to the base station 204) and thus communications should complete in a timelier manner. It is to be appreciated that the relay 206 can function as user equipment (e.g., another mobile device, access terminal, etc.) and continue operation when not functioning in a relay capacity. Moreover, the relay 206 can function transparently to the mobile device 202 and/or the base station 204. It is to be appreciated that the relay 206 can provide assistance to more than one mobile device at one time.

Figure 3:
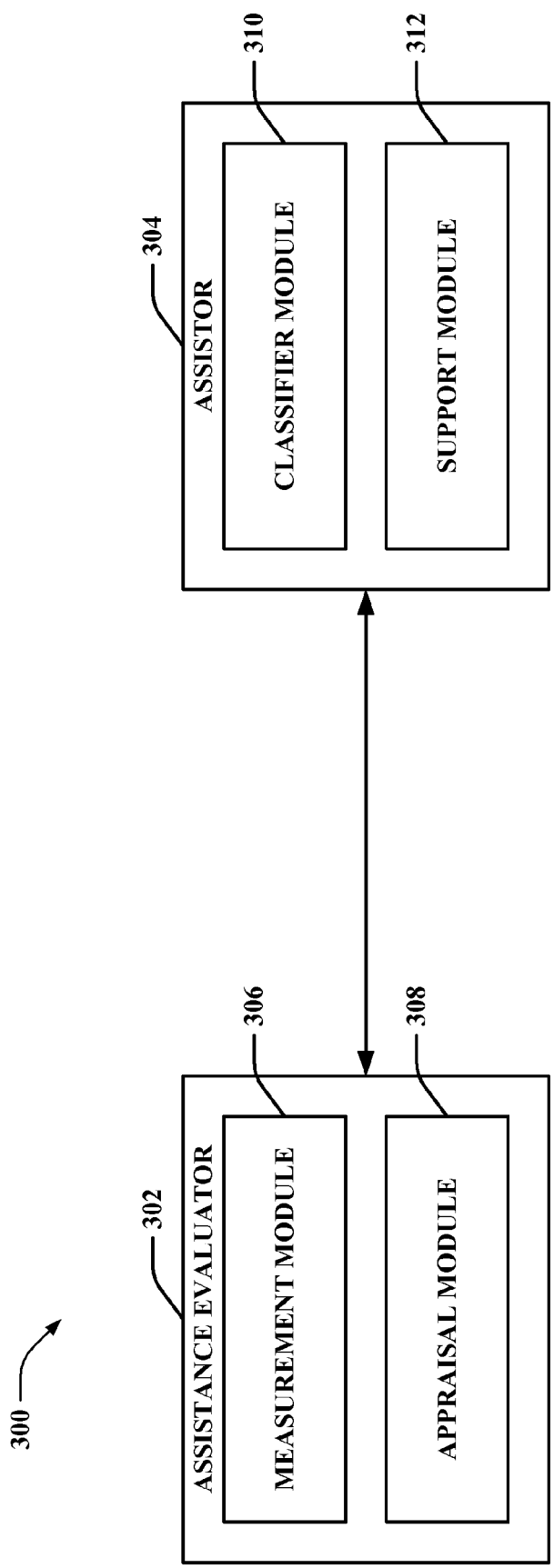
FIG. 3 illustrates a representative wireless communication system with an assistance evaluator and assistor in accordance with at least one aspect disclosed herein.

Now referring to FIG. 3, an example configuration 300 is disclosed for assisting a mobile device through use of a relay. An assistance evaluator 302 can be employed to determine if assistance of a mobile device should occur. Based upon a positive determination, an assistor 304 can enable dispatching of information (e.g., through use of a relay) related to the mobile device. It is to be appreciated that the assistance evaluator 302 and/or assistor 304 can implement upon a relay, a third party device, user equipment, etc.

The assistance evaluator 302 can employ a measurement module 306 that concludes if a relay is near an edge of a cell based upon evaluation of a downlink transmission. Being at the edge can minimize interference experienced from a base station engaged with a mobile device that is being assisted. In addition, the relay can be a valid access terminal of a communication network to decode downlink control information (e.g., access terminal uplink assignments).

An appraisal module 308 can be used that determines if assistance should be provided by the relay to a mobile device based upon analysis of an uplink transmission. According to one embodiment, the determination is made upon concluding that the relay is near the edge. The appraisal module 308 can function such that a determination is made that the mobile device is in close enough proximity to the relay (e.g., based upon an evaluation of the uplink transmission).

If it is determined that the relay is at the edge and that there is a mobile device that is close enough to the relay, then a classifier module 310 can be used that identifies that a mobile device should be provided assistance based upon monitored uplink and downlink information. Other metrics can be used in determining if there should be assistance provided to the mobile device, such as power consumption of the mobile device, of the relay, etc. Analysis that is more complex can be performed to determine if there should be assistance provided to the mobile device. For example, a mobile device can request relay assistance or it can be determined that while the relay is at an edge and a mobile device is close, there is estimated to be little benefit to use a relay (e.g., the mobile device is running at high efficiency).

A support module 312 can be used that provides assistance to the mobile device by instructing a relay to operate. The assistance can be in relation to uplink, downlink, forward link, reverse link, etc. Moreover, the assistance can be digital or analog as well as be in a limited instance (e.g., for a period of time) or so long as constraints are met (e.g., if the relay remains near an edge and the mobile device is still relatively close, then relaying can continue).

Figure 4:
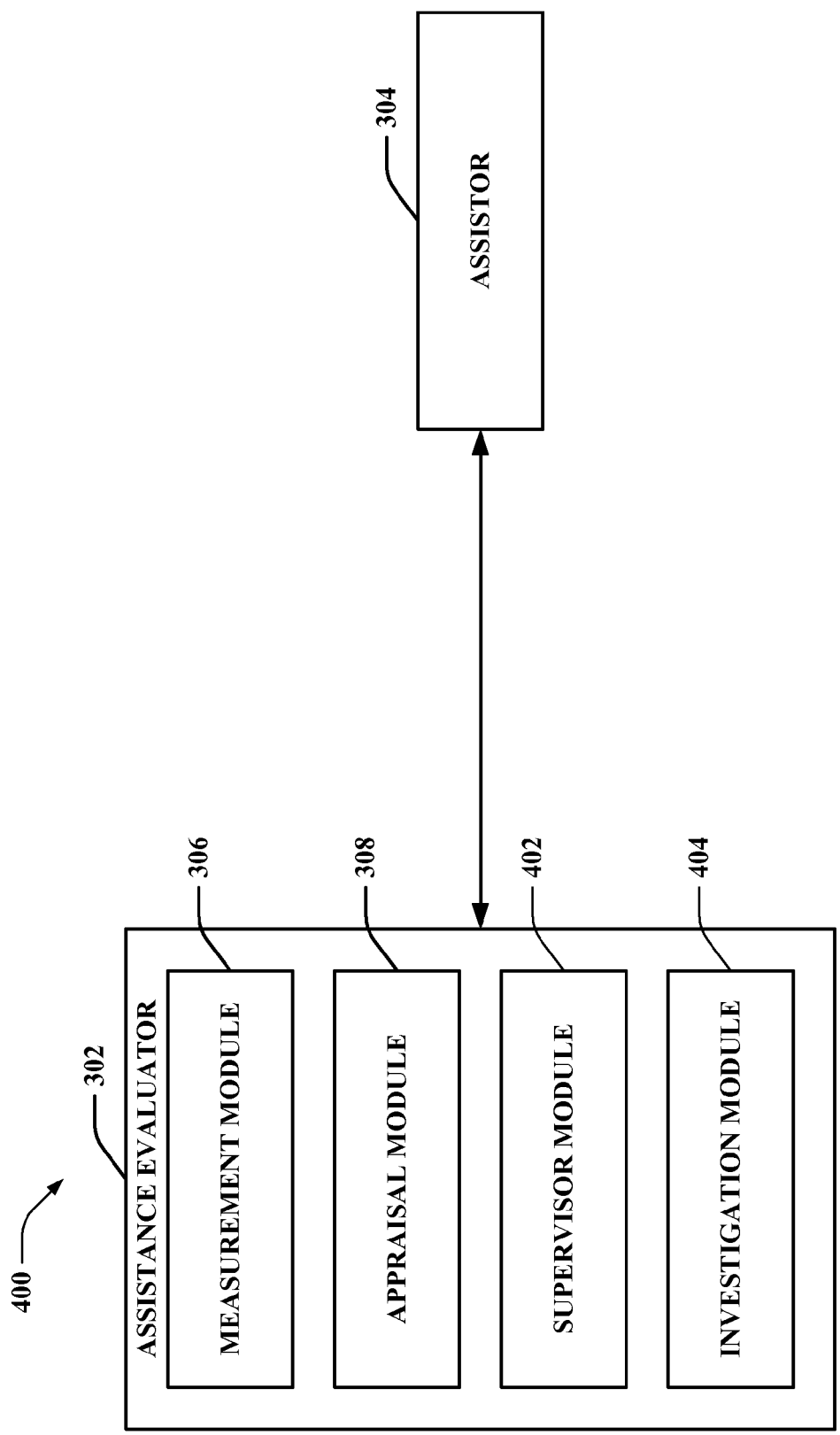
FIG. 4 illustrates a representative wireless communication system with a detailed assistance evaluator for operation regarding uplink transmission in accordance with at least one aspect disclosed herein.

Referring now to FIG. 4, an example system 400 is disclosed for monitoring an uplink transmission (e.g., radio uplink). An uplink transmission can include transmission from a mobile device to a base station (e.g., in a cellular network) or from a base station to a satellite (e.g., in a data transmission implementation). An assistance evaluator 302 (e.g., with measurement module 306 and/or appraisal module 308) can process uplink information while an assistor 302 provides support to a mobile device if appropriate.

A supervisor module 402 can be used that monitors the uplink transmission. The supervisor module 402 can globally observe communication (e.g., through performing a global scan within a geographical area) and identify uplink communication. In an alternative embodiment, the supervisor module 402 can make a request to an identified base station to provide information pertaining to engaged communications. If there is an engaged communication with a mobile device that is physically near a relay, then the supervisor module 402 can scrutinize the uplink.

An investigation module 404 can analyze the monitored uplink transmission (e.g., metadata pertaining to the transmission). A result of the analysis can used in making the determination on if assistance should be provided to the mobile device. For instance, if the uplink transmission suggests that the mobile device is physically far away from a relay, then a determination can be made that assistance should not be provided since there can be a high likelihood of interference and/or it could be wasteful of relay resources (e.g., since communication with a distant mobile device can use a relatively large amount of power).

It is to be appreciated that artificial intelligence techniques can be used to practice determinations and inferences disclosed herein. These techniques employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. These techniques can also include methods for capture of logical relationships such as theorem provers or more heuristic rule-based expert systems. These techniques can be represented as an externally pluggable module, in some cases designed by a disparate (third) party.

Figure 5:
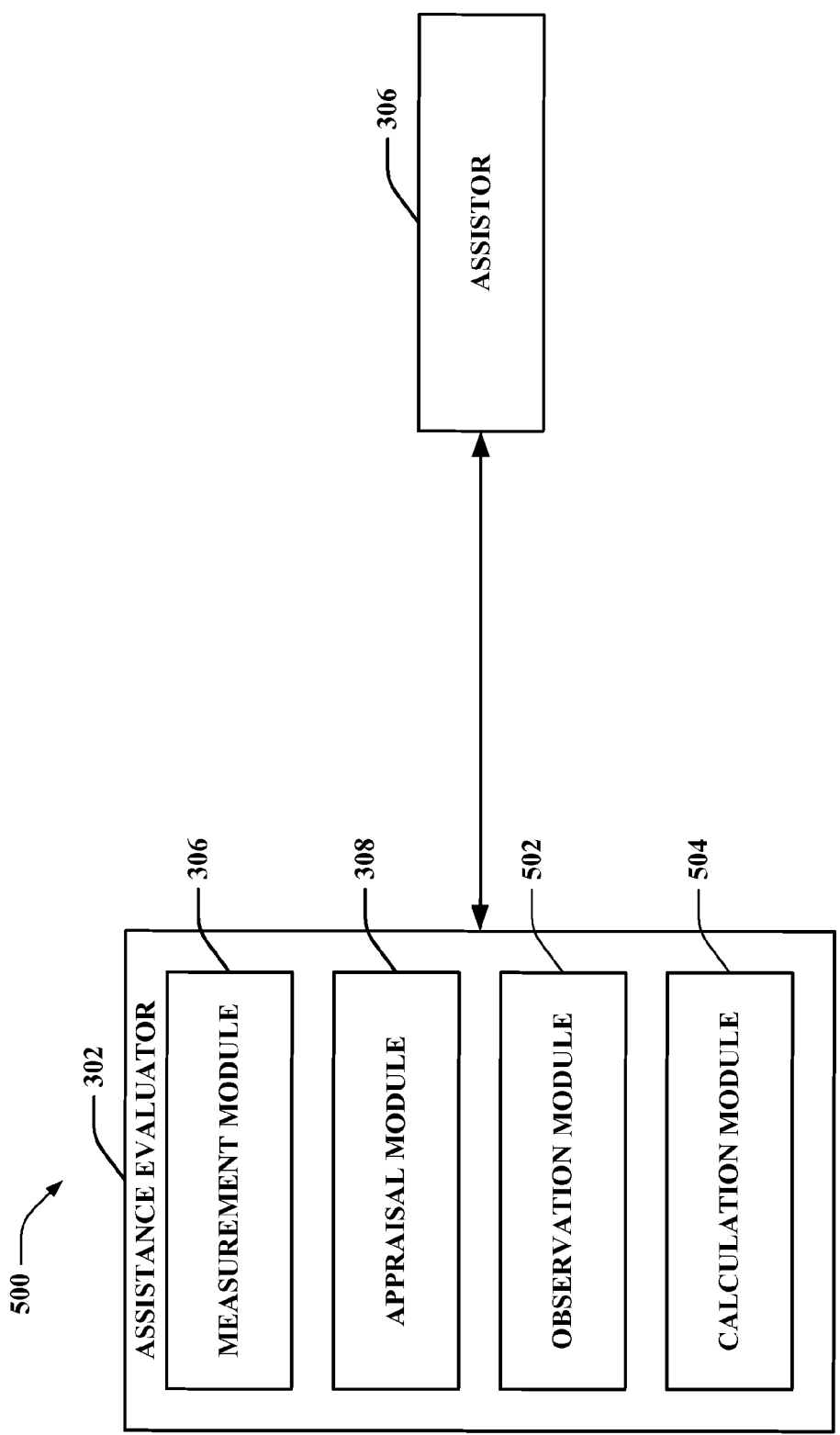
FIG. 5 illustrates a representative wireless communication system with a detailed assistance evaluator for operation regarding downlink transmission in accordance with at least one aspect disclosed herein.

Referring now to FIG. 5, an example system 500 is disclosed for processing downlink communication metadata. An assistance evaluator 302 (e.g., with measurement module 306 and/or appraisal module 308) and an assistor 304 can be employed in relation to assisting a mobile device. The assistance can be performed in sending uplink information as well as downlink information. An observation module 502 can be used that monitors a downlink transmission (e.g., global monitoring, specific monitoring, etc.). Similar functionality to the supervisor module 402 of FIG. 2 can be implemented by the observation module 502 (e.g., requesting downlink metadata from a base station) and vice versa.

A calculation module 504 can be used that evaluates the monitored downlink transmission (e.g., from a base station). A result of the evaluation can be used in making the conclusion of the measurement module 306 of FIG. 3 (e.g., the downlink information is analyzed to estimate a location of a relay in comparison to a cell of a base station). If it is determined that the relay is at an edge of the cell, then uplink communication can be monitored, processed, and used to determine if assistance should be provided.

According to one embodiment, the observation module 502 includes a manger (e.g., inherent of the observation module 502) that decodes downlink control information (e.g., access terminal uplink assignments). The decoded control information is processed to infer or determine a relay location in relation to a cell. In one embodiment, the relay is a valid access terminal (e.g., a terminal authorized to engage with a base station) that is scheduled on an uplink when decoding downlink control information.

Figure 6:
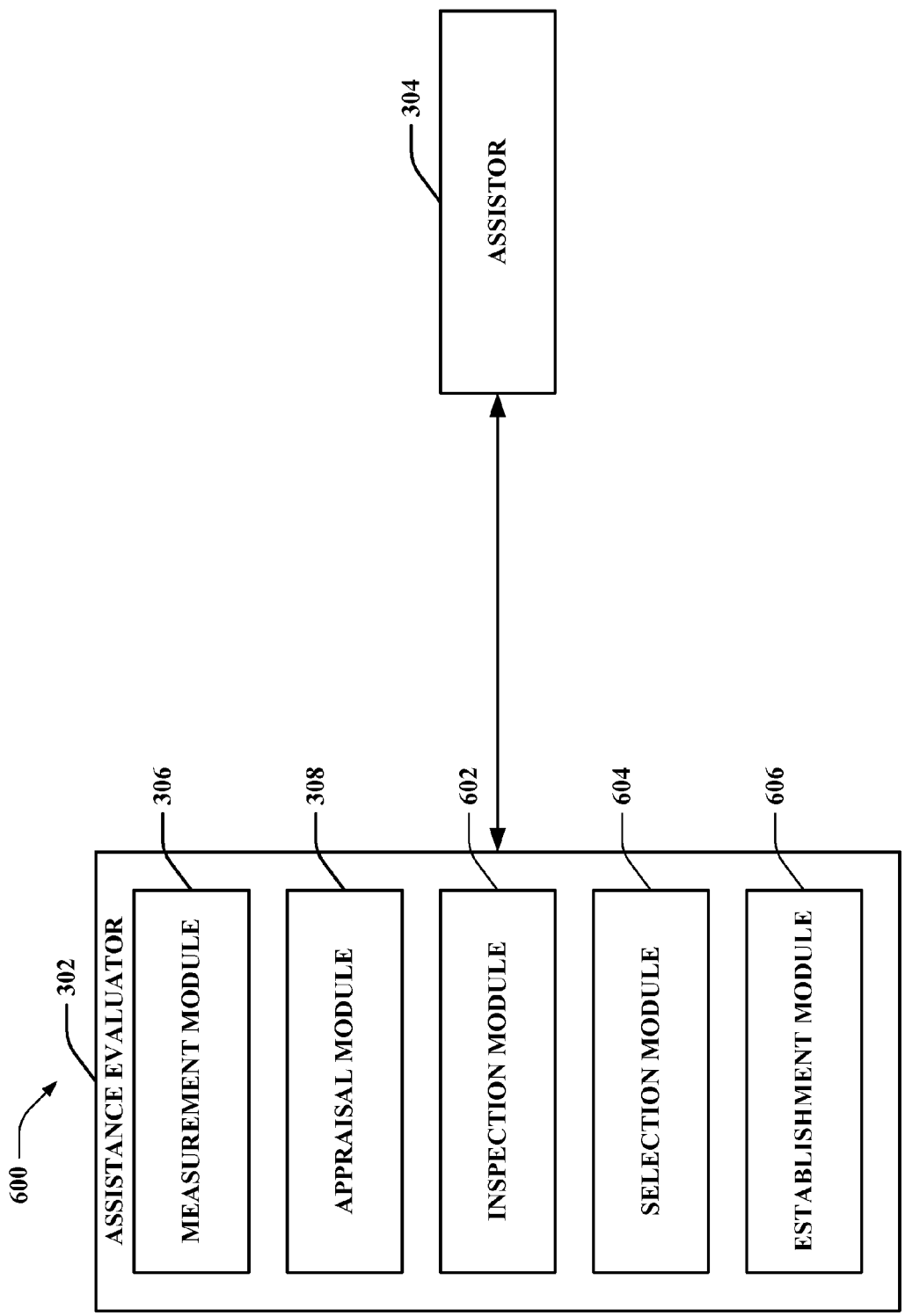
FIG. 6 illustrates a representative wireless communication system in accordance with a detailed assistance evaluator for operation regarding power usage in accordance with at least one aspect disclosed herein.

Referring to FIG. 6, an example system 600 is disclosed for using power of a mobile device to determine if assistance should be provided from a relay. An assistance evaluator 302 (e.g., with measurement module 306 and/or appraisal module 308) can be used to process power metadata and based upon a result of the processing (and evaluation of other information, such as uplink and downlink), an assistor 304 can be employed. Power usage of the mobile device can be indicative that the mobile device is struggling in operation and benefit from a relay.

An inspection module 602 can be used that monitors power capability of the mobile device. The power capability can be used in determining if assistance should be provided by the relay to the mobile device. The relay provides assistance based upon a positive determination (e.g., a determination based upon uplink communication, power and uplink communication, etc.). Additionally, battery condition can be used in determining if assistance should be provided. For example, if a mobile device is low on battery power, then a relay can be employed to facilitate energy conservation (e.g., using the relay permits the mobile device to expend less power and/or operate for a shorter timeframe).

According to one embodiment, a threshold level is used to determine if assistance should be provided by the relay to the mobile device (e.g., there is use of the threshold level to determine if the mobile device and relay are physically close enough to one another). A selection module 604 can set the threshold through comparing a data rate transmission of the mobile device against a signal-to-interference ratio (SINR) of the data rate transmission. For instance, if the data rate is very low relative to what can be supported based on SINR, then the mobile device can be a likely candidate for assistance. The amount of the threshold value can be established during operation, when implementing the relay or mobile device, etc. In one configuration, a scoring system can be used by a relay, where mobile device are assigned a score based upon physical proximity (e.g., established by uplink communication) or power consumption. The scores can be compared against one another and a mobile device with an appropriate score (e.g., a highest score, above a score threshold, etc.) can be assisted. An establishment module 606 can be used that resolves how to support the mobile device (e.g., determines that analog assistance is appropriate), the assistance is provided in accordance with a result of the resolution.

Figure 7:
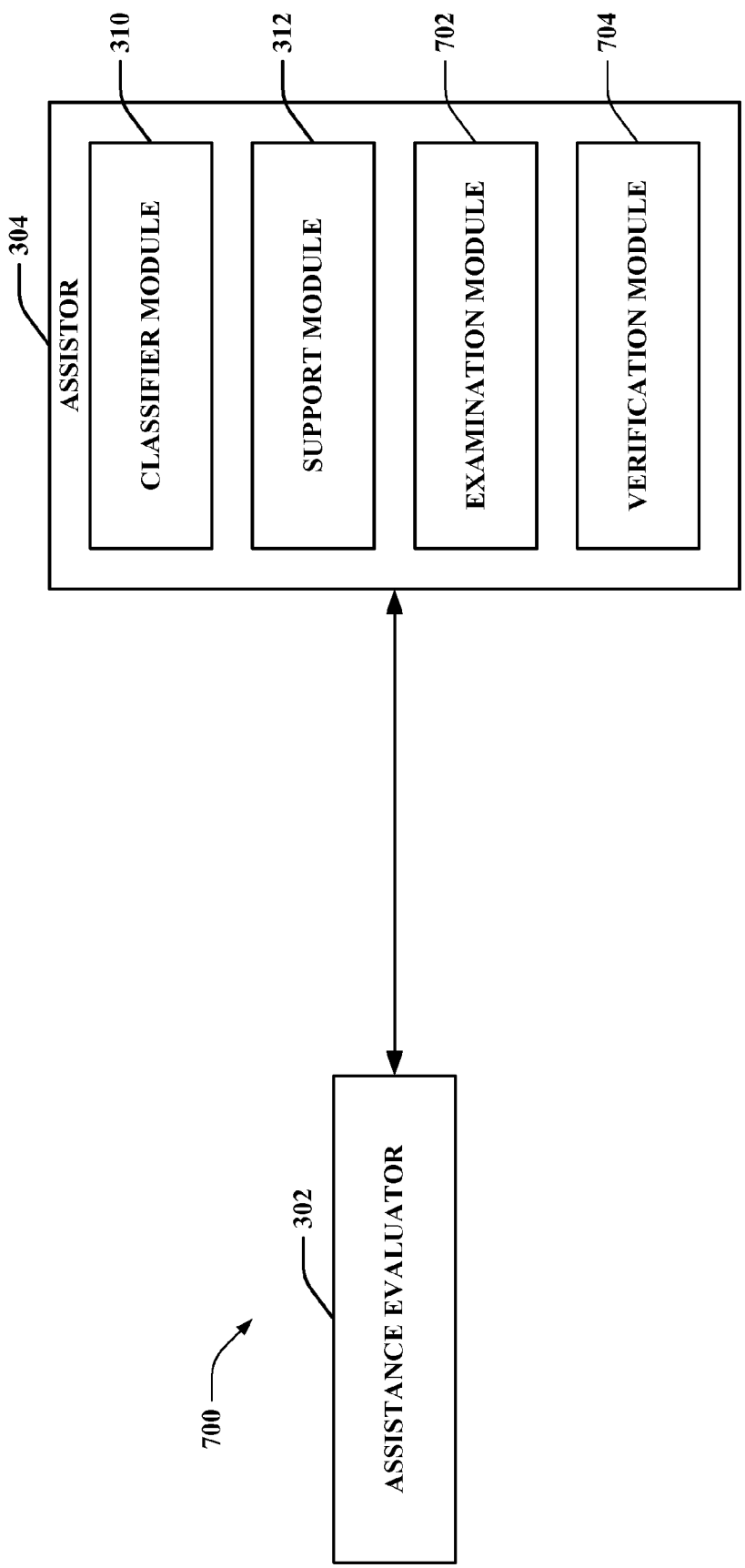
FIG. 7 illustrates a representative wireless communication system with a detailed assistor for operation regarding a downlink assignment channel in accordance with at least one aspect disclosed herein.

Now referring to FIG. 7, an example system 700 is disclosed to facilitate providing assistance to a mobile device (e.g., assist in forwarding information). An assistance evaluator 302 and an assistor 304 (e.g., with classifier module 310 and/or support module 312) can be used (e.g., implemented upon a relay) to listen to a downlink and uplink communication session. A determination can be made on if analog or digital assistance should be provided upon learning that assistance is appropriate. According to one embodiment, the supporter 212 retransmits a delayed version of an access terminal signal used by the mobile device.

The assistor can use an examination module 702 that monitors a downlink assignment channel. The examination module 702 can implement along with (e.g., as the same entity) and/or share functionality with the observation module 502 of FIG. 5 and vice versa. A verification module 704 can be employed that determines a start time of an uplink transmission for the mobile device (e.g., neighboring access terminal) based upon the monitored downlink assignment channel. Additionally, evaluation of the downlink assignment channel can take place to determine a nature of the assignment (e.g., the assignment is sticky or persistent, and the like).

Figure 8:
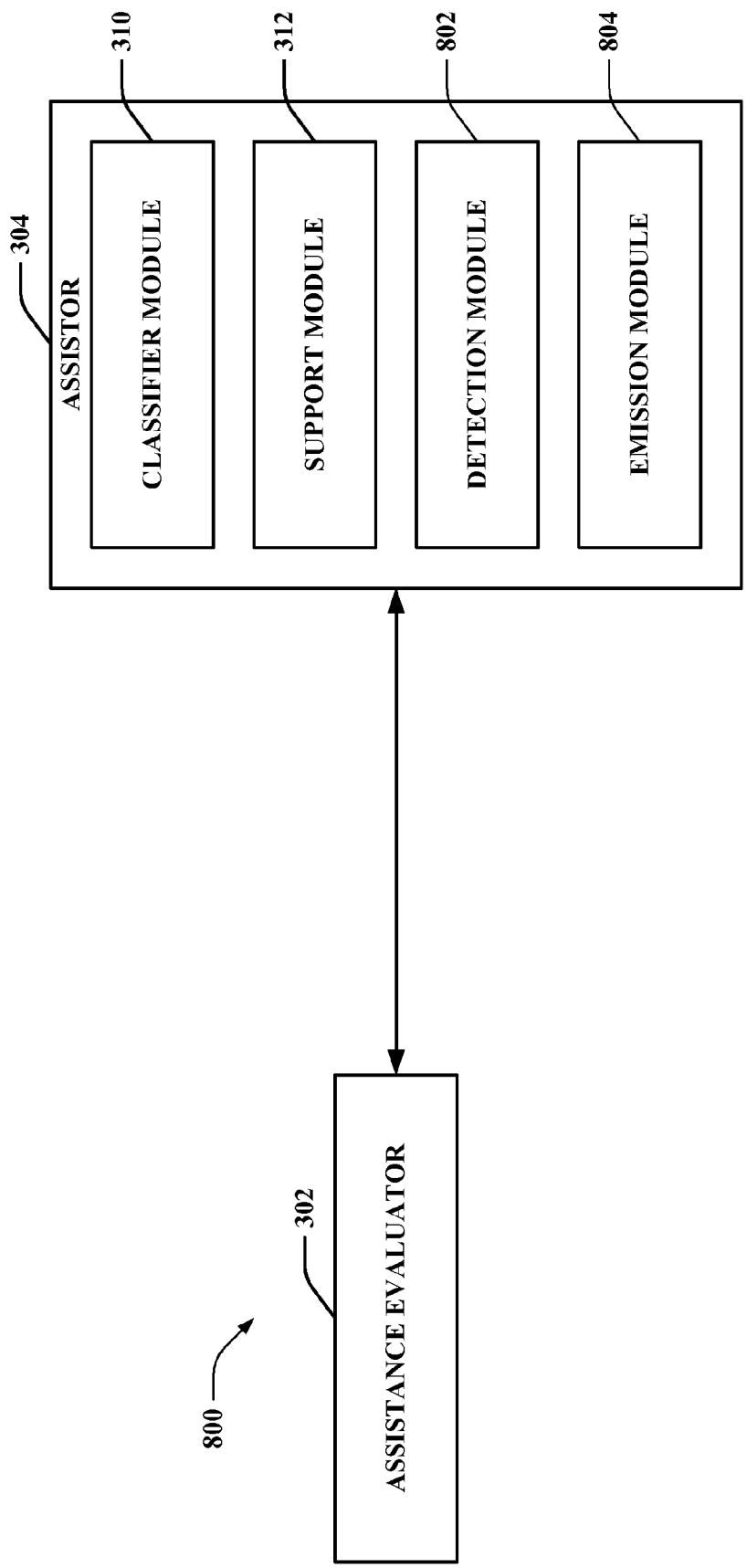
FIG. 8 illustrates a representative wireless communication system with a detailed assistor for operation regarding uplink communication in accordance with at least one aspect disclosed herein.

Now referring to FIG. 8, an example system 800 is disclosed for processing uplink communication concerning assisting a mobile device. An assistance evaluator 302 and an assistor 304 (with a classifier module 310 and support module 312) can process information to determine assistance to provide as well as to provide the determined assistance. A check can take place with the mobile device to confirm that assistance is allowed where assistance does not take place without permission (e.g., permission of a mobile device or base station). However, the assistance can also be provided such that the mobile device and/or the base station (e.g., true base station) are unaware of the assistance.

The assistor 204 can use a detection module 802 that monitors an uplink communication for the mobile device. Functionality can be shared between the assistor 204 and the supervisor module 402 of FIG. 4 (e.g., implement together). As part of the assistance, an uplink communication can be transmitted through the relay—therefore the assistor 304 can use an emission module 804 that transmits a scaled version of the uplink communication. Moreover, the assistor can determine how to scale the communication and perform the scaling. It is to be appreciated that monitoring and transmission can occur upon one band (e.g., through use of two separate RF (radio frequency) chains and antennas).

Figure 9:
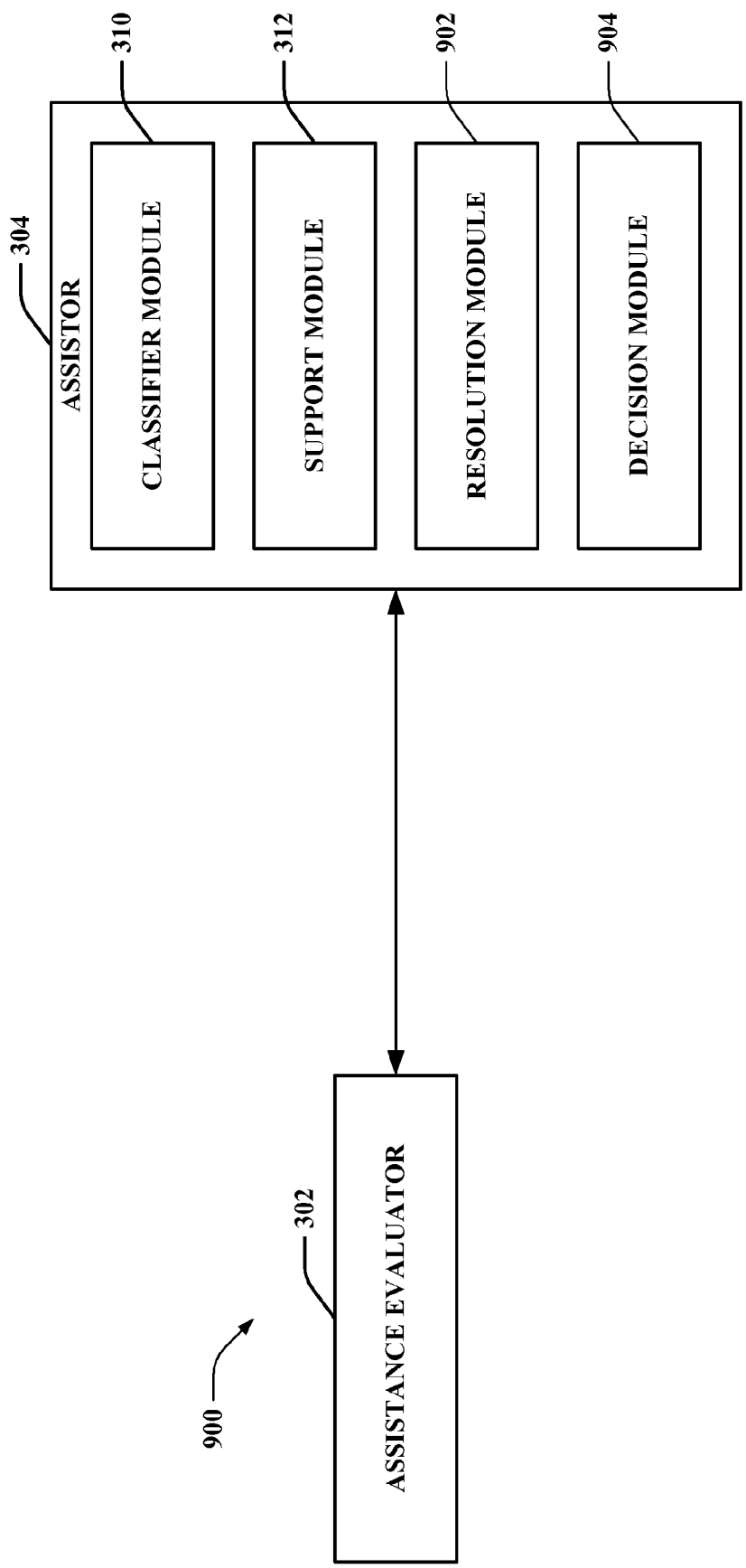
FIG. 9 illustrates a representative wireless communication system with a detailed assistor for operation regarding relay transmit power in accordance with at least one aspect disclosed herein.

Now referring to FIG. 9, an example system 900 is disclosed for using power capabilities of the mobile device in providing assistance. An assistance evaluator 302 can make observation concerning engagement between a mobile device and a base station. An assistor 304 (with a classifier module 310 and support module 312) can provide assistance to the mobile device (e.g., aid in information communication)

A resolution module 902 can be used that determines a manner (e.g., how to provide assistance, to what level assistance should be provided) in which to assist the mobile device. For instance, a mobile device can struggle in providing information to a base station, so the resolution module 902 can determine that the relay should assist in providing information. However, if the relay is also functioning as a mobile device and has a relatively large number of resources being consumed, then a determination can be made that the level of assistance should be relatively low.

According to one embodiment, transmit power of the relay can be taken into account in determining the manner. A decision module 904 can select a transmit power of the relay (e.g., an amount of power to be used in providing assistance to the mobile device), the selected transmit power is used in determining the manner. Since higher power can cause higher interference, the transmit power should be kept as low as reasonably possible.

Figure 10:
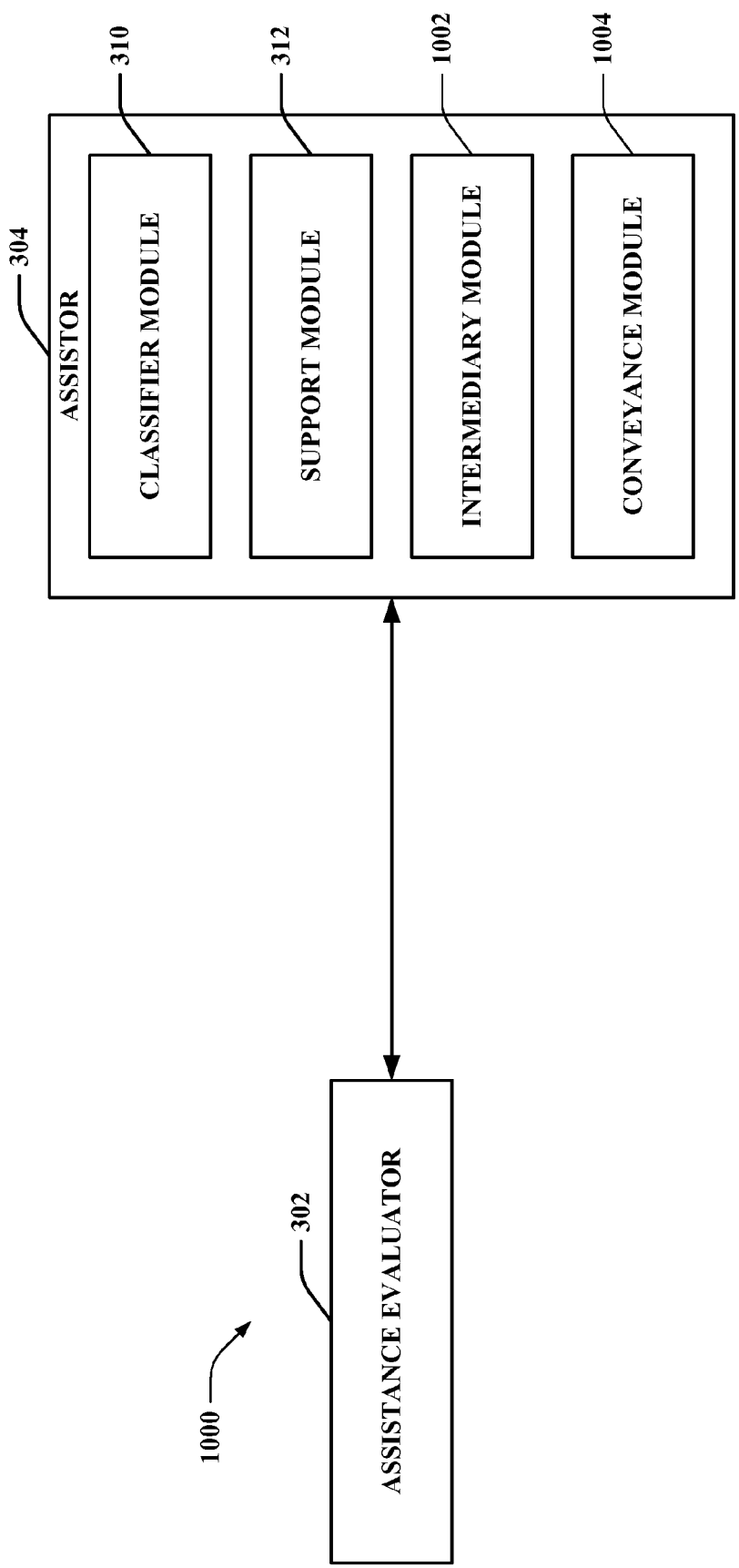
FIG. 10 illustrates a representative wireless communication system with a detailed assistor for operation regarding digital assistance in accordance with at least one aspect disclosed herein.

Now referring to FIG. 10, an example system 1000 is disclosed for facilitating communication forwarding. An assistance evaluator 302 and an assistor 304 (e.g., with classifier module 310 and/or support module 312) can be used to determine that assistance to a mobile device should be provided. In addition, a check can be performed by the assistance evaluator 302 or the assistor to determine if there is a ban on relay performance. For instance, if a mobile device emits highly sensitive information, then it can be desirable for the mobile device alone to emit information, even if emission is at a less then desirable rate. A scan of the communication (e.g., uplink, downlink, etc.), mobile device, base station, etc. can determine that there is an instruction that relay should not occur and the relay can follow the instruction.

According to one implementation, the assistance provided by the assistor 304 can be digital. An intermediary module 1002 can be used that intercepts a packet on a first communication from the mobile device to a base station and a conveyance module 1004 can be employed that retransmits the packet (e.g., to the base station). For instance, in a communication there can be multiple attempts to send a packet of information before all the information can be appreciated by the base station. Therefore, if at least one relay transfers the packets, appreciation can take place in less time.

Figure 11:
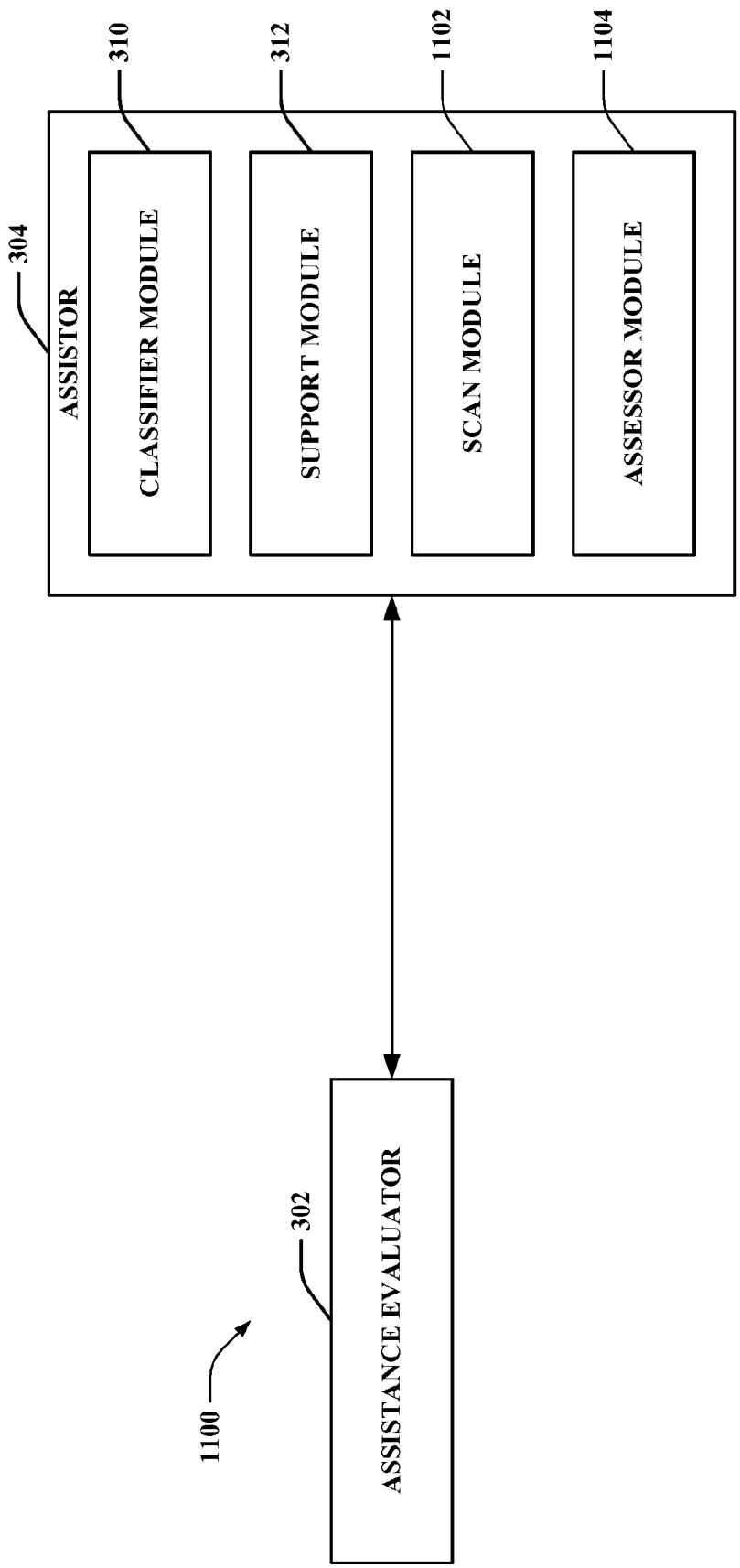
FIG. 11 illustrates a representative wireless communication system with a detailed assistor for monitoring mobile device operation in accordance with at least one aspect disclosed herein.

Now referring to FIG. 11, an example system 1100 is disclosed for determining if assistance should be provided to a mobile device. An assistance evaluator 302 and an assistor 304 (e.g., with classifier module 310 and/or support module 312) can be used evaluate communication between the mobile device and base station. A scan module 1102 can be used that observes communication of the mobile device. The scanner can incorporate aspect disclosed herein, including those of the supervisor module 402 of FIG. 4 and/or the observation module 502 of FIG. 5. An assessor module 1104 can analyze a product of the observation and a result of the analysis can be used in making the identification. Functionality of the assistance evaluator 302 can be carried over to the assessor module 1104 and vice versa.

Figure 12:
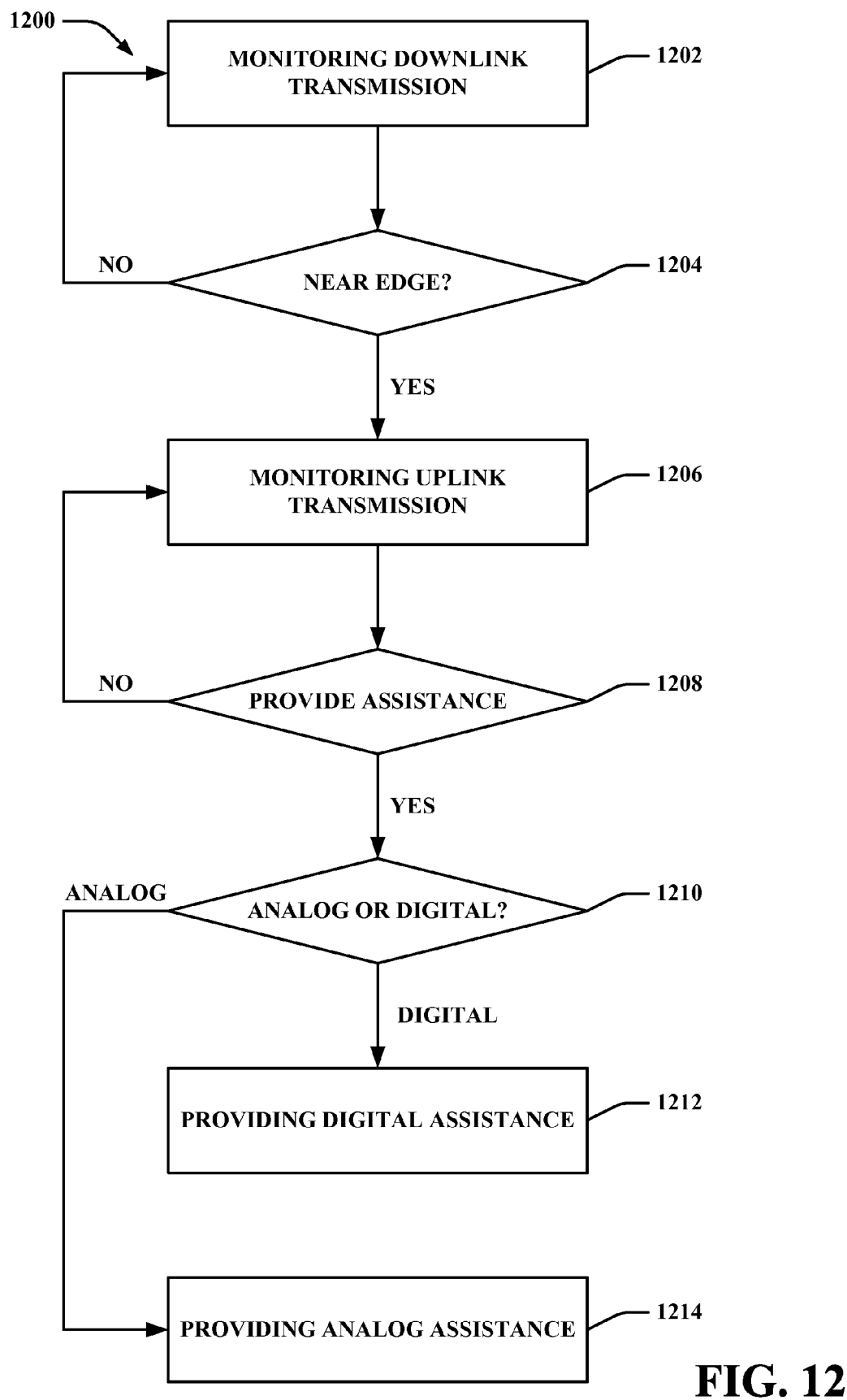
FIG. 12 illustrates a representative methodology for operation of a relay in accordance with at least one aspect disclosed herein.

Now referring to FIG. 12, an example methodology 1200 is disclosed for evaluating a mobile device relationship with a base station and determining if assistance should be provided through use of a relay. Downlink transmission of a base station can be monitored at action 1202 and an inference can be drawn between the monitored transmission and a location of a relay (e.g., potential relay) to the base station. A check 1204 can take place to determine if the relay is near and edge of a cell of the base station. If the relay is not near the edge, then the methodology 1200 can return to action 1202. According to an alternative embodiment, a measurement can be taken or estimated on how close the relay is to the edge and the check 1202 can determine if further operation should occur enough if the relay is not at the edge (e.g., the relay is close enough to the edge to warrant further functionality).

If it is determined that the relay is near the edge, then an uplink transmission from at least one mobile device to the base station can be monitored at event 1206. Thus, a relay can listen to a downlink and an uplink—for instance, in an FDD system, there can be radio frequency capabilities and baseband processing to listen to different bands. Check 1208 can operate to determine if assistance should be provided to the mobile device. If there should not be assistance provided, the methodology 1200 can return to event 1206 such that changes can occur where the check 1208 produces a different result.

If assistance should be provide, then the another check 1210 can take place to determine if analog or digital assistance should be provided. A type of assistance to provide can be hard-coded in a relay, base station, mobile device, . . . or can be determined based upon contextual factors. If digital assistance should be provided, then the methodology 1200 can provide digital assistance at act 1212; if analog assistance should be provided, then the methodology 1200 can provide analog assistance at act 1214.

Figure 13:
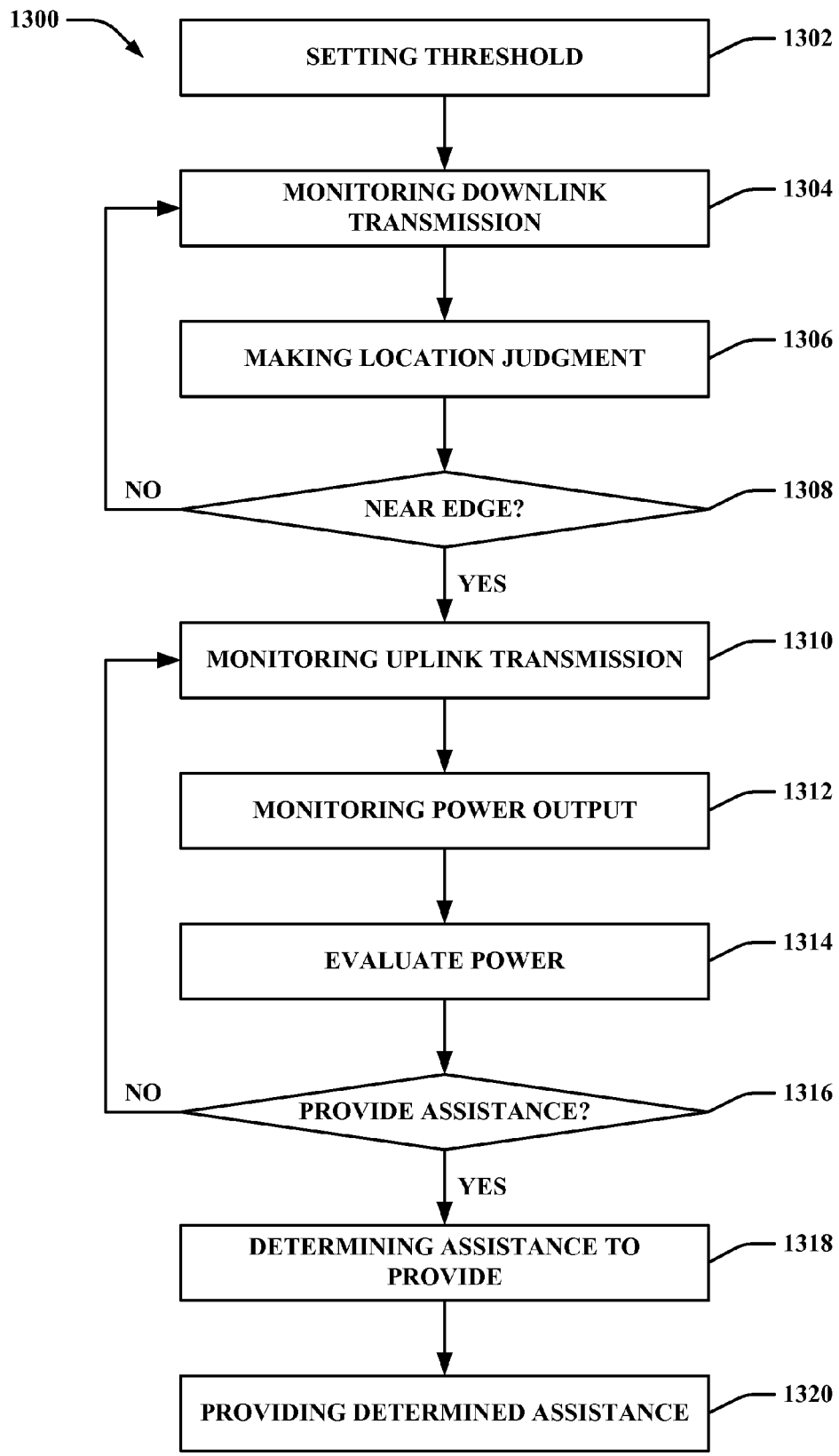
FIG. 13 illustrates a representative methodology for determining if assistance should be provided in accordance with at least one aspect disclosed herein.

Now referring to FIG. 13, an example methodology 1300 is disclosed for determining if assistance should be provided to a mobile device from a relay. A power threshold can be set at act 1302 to regulate how much power of a relay should be dedicated to an assistance operation. While the threshold can be global (e.g., applied to all mobile device assistance operations), the methodology 1300 can also configure such that the threshold is set for engagements individual mobile device encounters. Moreover, the threshold set at act 1302 can be for the mobile device—power used by the mobile device can be a factor in determining if assistance should be provided (e.g., high power usage signifies assistance should be given).

Monitoring of a downlink transmission can occur through event 1304 and an estimate can be made on a relay position in relation to a cell of a base station and an absolute position at action 1306. A check 1308 can determine if a relay is near an edge of the cell. If the relay is not near the cell, then the methodology can return to event 1304.

If the relay is near the edge of the cell, the uplink transmission of the mobile device can be monitored at event 1310. In addition to monitoring an uplink transmission, power output can be monitored at act 1312 (e.g., output of the relay, of the mobile device, etc.) and evaluated at event 1314 (e.g., comparing an actual power level against a power threshold). A check 1316 can determine if assistance should be provided to a mobile device.

If assistance is not to be provided, then the methodology 1300 can return to monitoring uplink transmission at event 1310 (e.g., to determine if there is a change and thus potential that the outcome of check 1316 change). In an alternative embodiment, the methodology 1300 can return to act 1312 (e.g., to determine if power level changes enough to warrant a different outcome of check 1316). If assistance should be provided, then a determination can be made on the assistance to provide at action 1318 and the assistance can be provided at action 1320.

Figure 14:
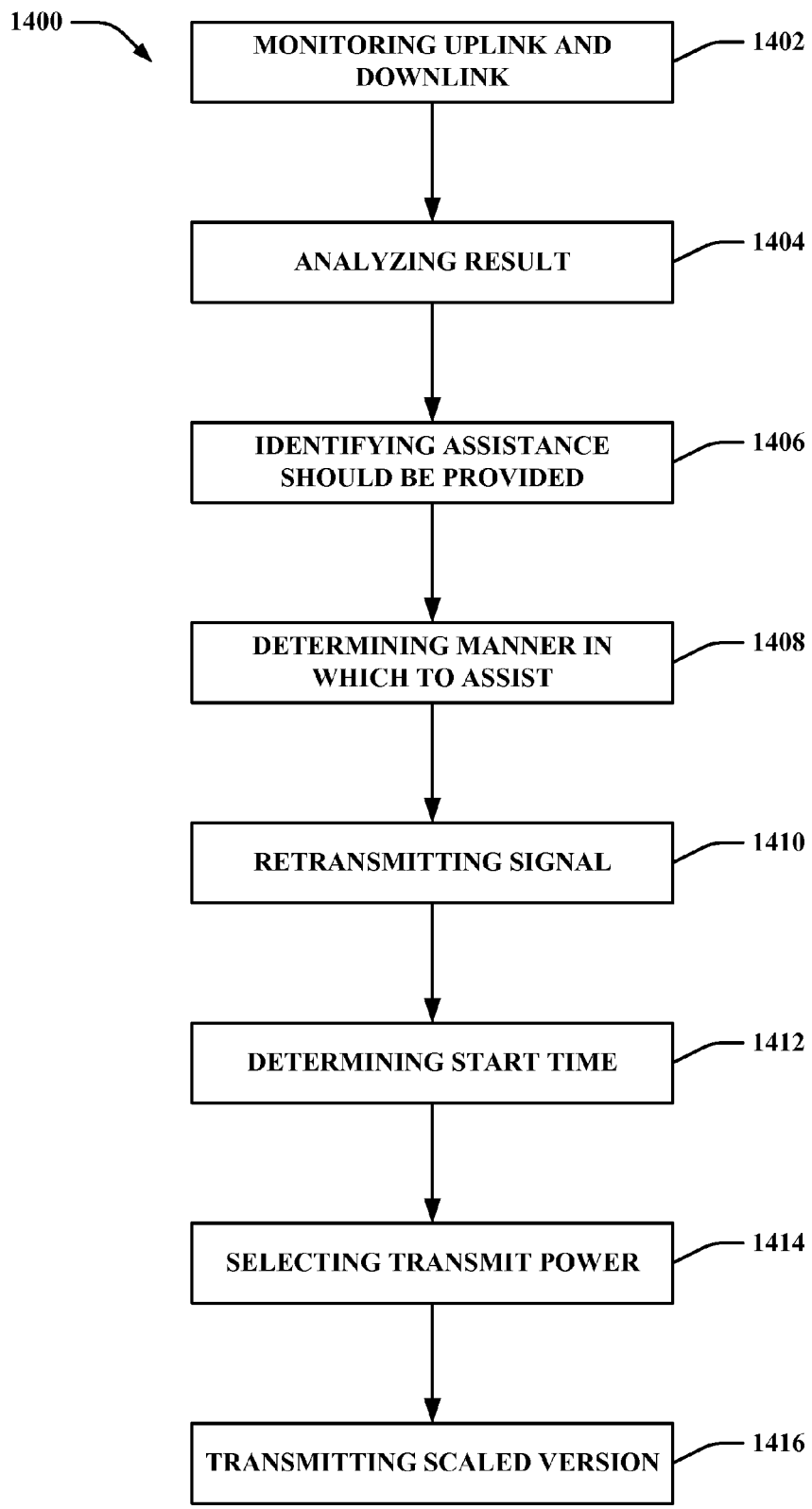
FIG. 14 illustrates a representative methodology for providing analog assistance in accordance with at least one aspect disclosed herein.

Now referring to FIG. 14, an example methodology 1400 is disclosed for providing assistance to a mobile device (e.g., providing uplink assistance). Uplink and downlink of communication between a mobile device and base station can take place at event 1402. A result of the monitoring can be analyzed at act 1404 and identification can occur on if there should be assistance provided at action 1406 (e.g., analog assistance). Upon determining that assistance should be provided, a manner in which to provide the assistance can be determined.

There can be retransmission of a delayed version of an access terminal signal used by the mobile device at action 1410 (e.g., another instance of an uplink transmission offset from when the mobile device sends the uplink transmission). Additionally, there can be determining a start time of an uplink transmission for the mobile device based upon the monitored downlink assignment channel at act 1412. At event 1414, there can be selecting a transmit power of the relay, the selected transmit power is used in determining the manner and at action 1416 there can be transmitting a scaled version of the uplink communication.

Figure 15:
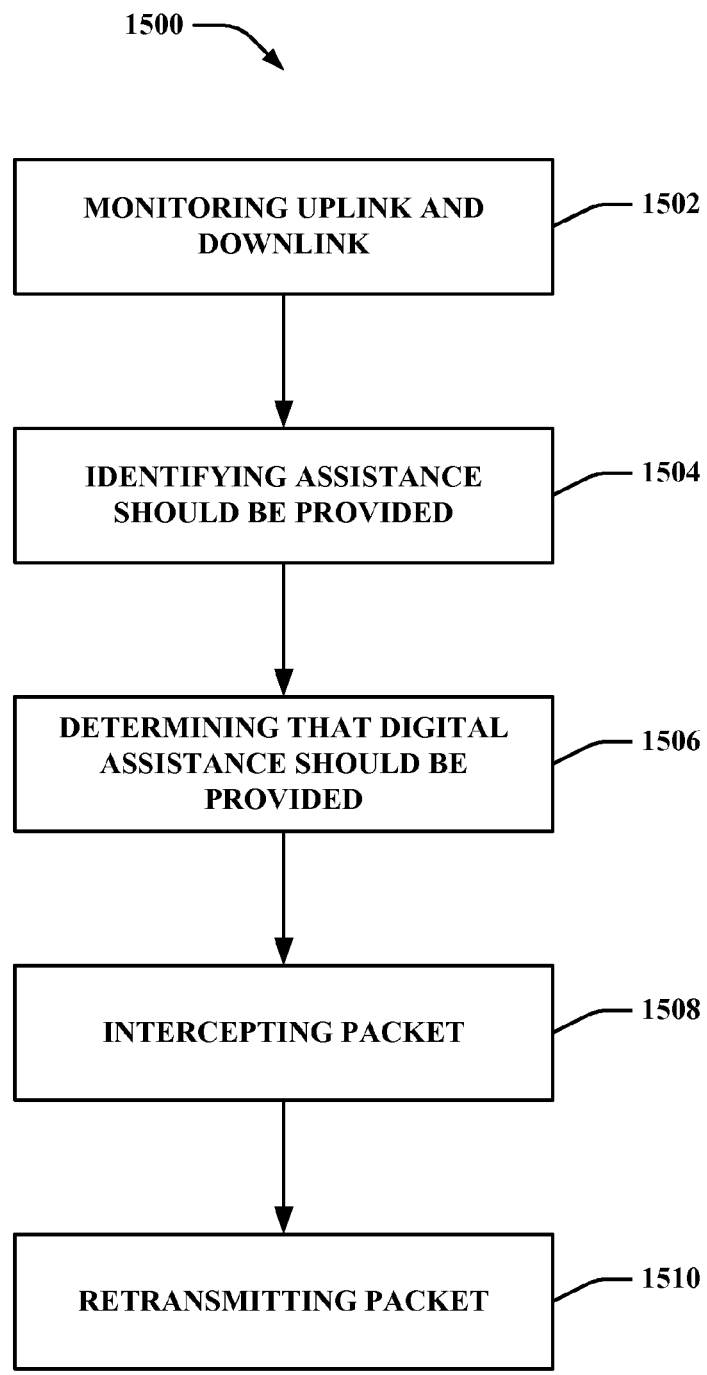
FIG. 15 illustrates a representative methodology for providing digital assistance in accordance with at least one aspect disclosed herein.

Now referring to FIG. 15, an example methodology 1500 is disclosed for providing digital assistance to a mobile device from a relay. Monitoring of an uplink and downlink communication between a mobile device and base station can occur at event 1502. Based upon a result of the uplink and downlink monitoring, there can be an identification (e.g., a determination made, a communication received, etc.) that assistance should be provided at act 1504.

Additionally, there can be a determination made that digital assistance should be provided through event 1506. If there is to be digital assistance, a packet communicated from the mobile device to the base station can be intercepted and evaluated at act 1508. The packet can be retransmitted at action 1510 as many times as appropriate (e.g., until the base station appreciates the packet information).

Referring to FIGS. 12-15, methodologies relating to operations regarding relay assistance. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

It will be appreciated that, in accordance with one or more aspects described herein, inferences can be made regarding whether information should be disclosed, what metadata should be presented, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to a location of a mobile device in a cell. By way of further illustration, an inference can be made related to a manner of providing assistance. It will be appreciated that the foregoing examples are illustrative in nature and are not intended to limit the number of inferences that can be made or the manner in which such inferences are made in conjunction with the various embodiments and/or methods described herein.

Figure 16:
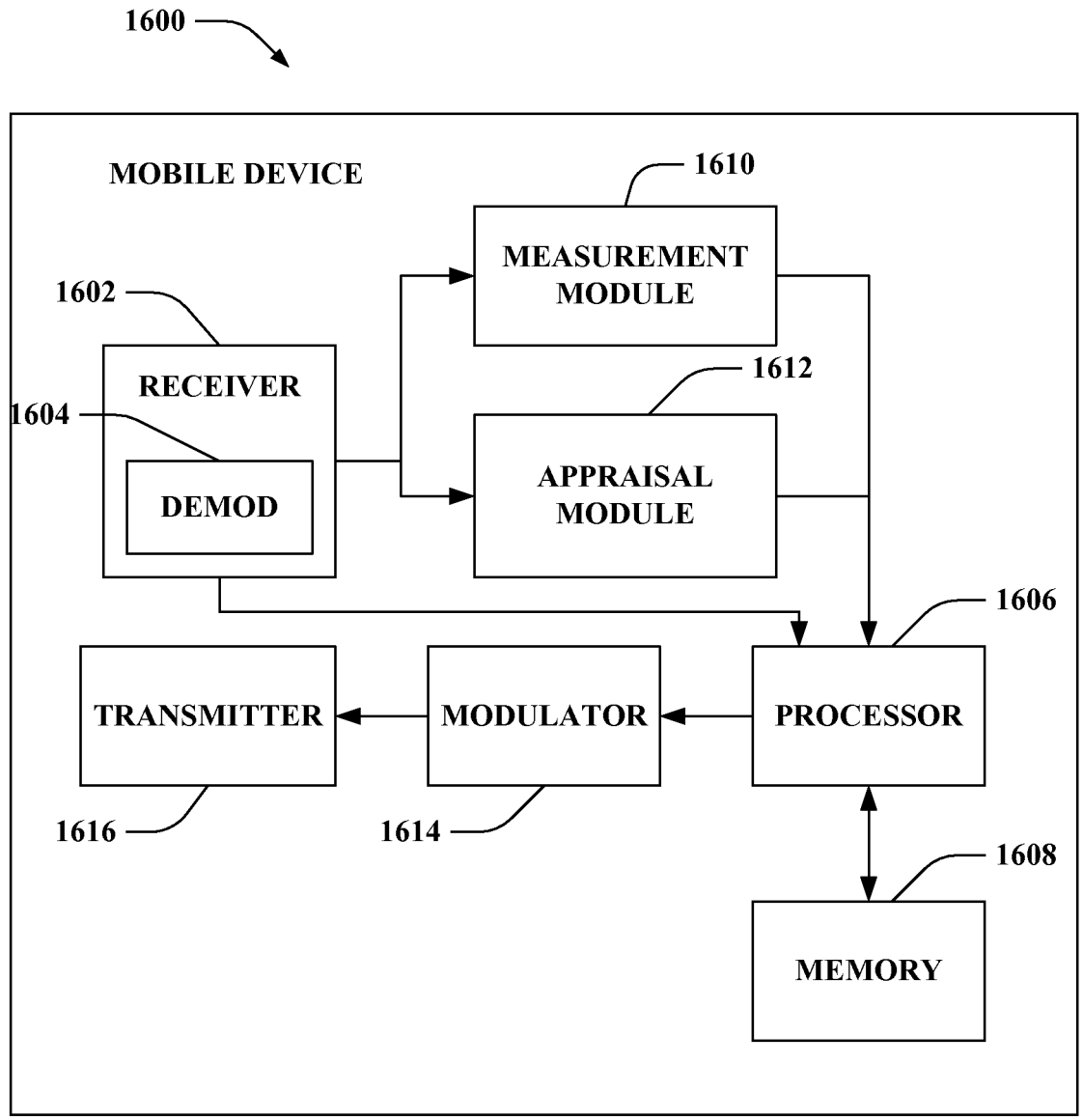
FIG. 16 illustrates a representative mobile device in accordance with at least one aspect disclosed herein.

FIG. 16 is an illustration of a mobile device 1600 that facilitates determining if relay assistance should be provided to the mobile device 1600. Mobile device 1600 comprises a receiver 1602 that receives a signal from, for instance, a receive antenna (not shown), and performs typical actions thereon (e.g., filters, amplifies, downconverts, etc.) the received signal and digitizes the conditioned signal to obtain samples. Receiver 1602 can be, for example, an MMSE receiver, and can comprise a demodulator 1604 that can demodulate received symbols and provide them to a processor 1606 for channel estimation. Processor 1606 can be a processor dedicated to analyzing information received by receiver 1602 and/or generating information for transmission by a transmitter 1616, a processor that controls one or more components of mobile device 1600, and/or a processor that both analyzes information received by receiver 1602, generates information for transmission by transmitter 1616, and controls one or more components of mobile device 1600.

Mobile device 1600 can additionally comprise memory 1608 that is operatively coupled to processor 1606 and that can store data to be transmitted, received data, information related to available channels, data associated with analyzed signal and/or interference strength, information related to an assigned channel, power, rate, or the like, and any other suitable information for estimating a channel and communicating via the channel. Memory 1608 can additionally store protocols and/or algorithms associated with estimating and/or utilizing a channel (e.g., performance based, capacity based, etc.).

It will be appreciated that the data store (e.g., memory 1608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1608 of the subject systems and methods is intended to comprise, without being limited to, these and any other suitable types of memory.

Processor 1602 is further operatively coupled to a measurement module 1610 and/or an appraisal module 1612. The measurement module 1610 can ascertain if the mobile device 1600 is near an edge of a cell. In addition, the appraisal module 1612 can determine if assistance should be provided to the mobile device 1600 by another base station or device functioning as a relay. Mobile device 1600 still further comprises a modulator 1614 and a transmitter 1616 that transmits a signal (e.g., base CQI and differential CQI) to, for instance, a base station, another mobile device, etc. Although depicted as being separate from the processor 1606, it is to be appreciated that the measurement module 1610 and/or appraisal module 1612 can be part of processor 1606 or a number of processors (not shown).

Figure 17:
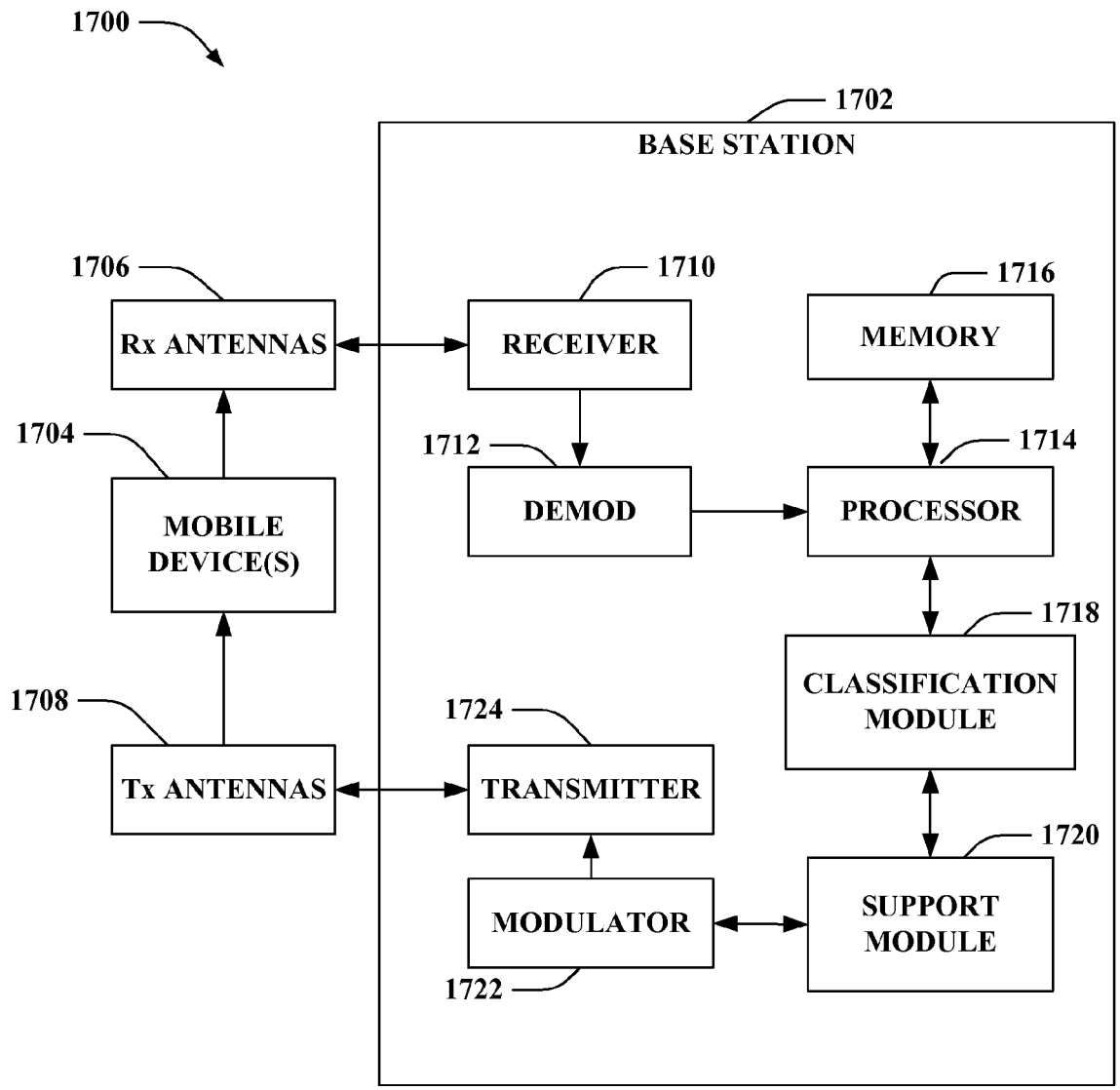
FIG. 17 illustrates a representative base station in accordance with at least one aspect disclosed herein.

FIG. 17 is an illustration of a system 1700 that facilitates assisting a mobile device through relay functionality. System 1700 comprises a base station 1702 (e.g., access point, . . . ) with a receiver 1710 that receives signal(s) from one or more mobile devices 1704 through a plurality of receive antennas 1706, and a transmitter 1722 that transmits to the one or more mobile devices 1704 through a plurality of transmit antennas 1708. Receiver 1710 can receive information from receive antennas 1706 and is operatively associated with a demodulator 1712 that demodulates received information. Demodulated symbols are analyzed by a processor 1714 that can be similar to the processor described above with regard to FIG. 16, and which is coupled to a memory 1716 that stores information related to estimating a signal (e.g., pilot) strength and/or interference strength, data to be transmitted to or received from mobile device(s) 1704 (or a disparate base station (not shown)), and/or any other suitable information related to performing the various actions and functions set forth herein.

Processor 1714 is further coupled to a classification module 1718 and/or to a support module 1720. The classification module 1718 can identify that assistance should be provided while a support module 1720 can provide the assistance. Information to be transmitted can be provided to a modulator 1722. Modulator 1722 can multiplex the information for transmission by a transmitter 1724 through antenna 1708 to mobile device(s) 1704. Although depicted as being separate from the processor 1714, it is to be appreciated that the classification module 1718 and/or support module 1720 can be part of processor 1714 or a number of processors (not shown).

Figure 18:
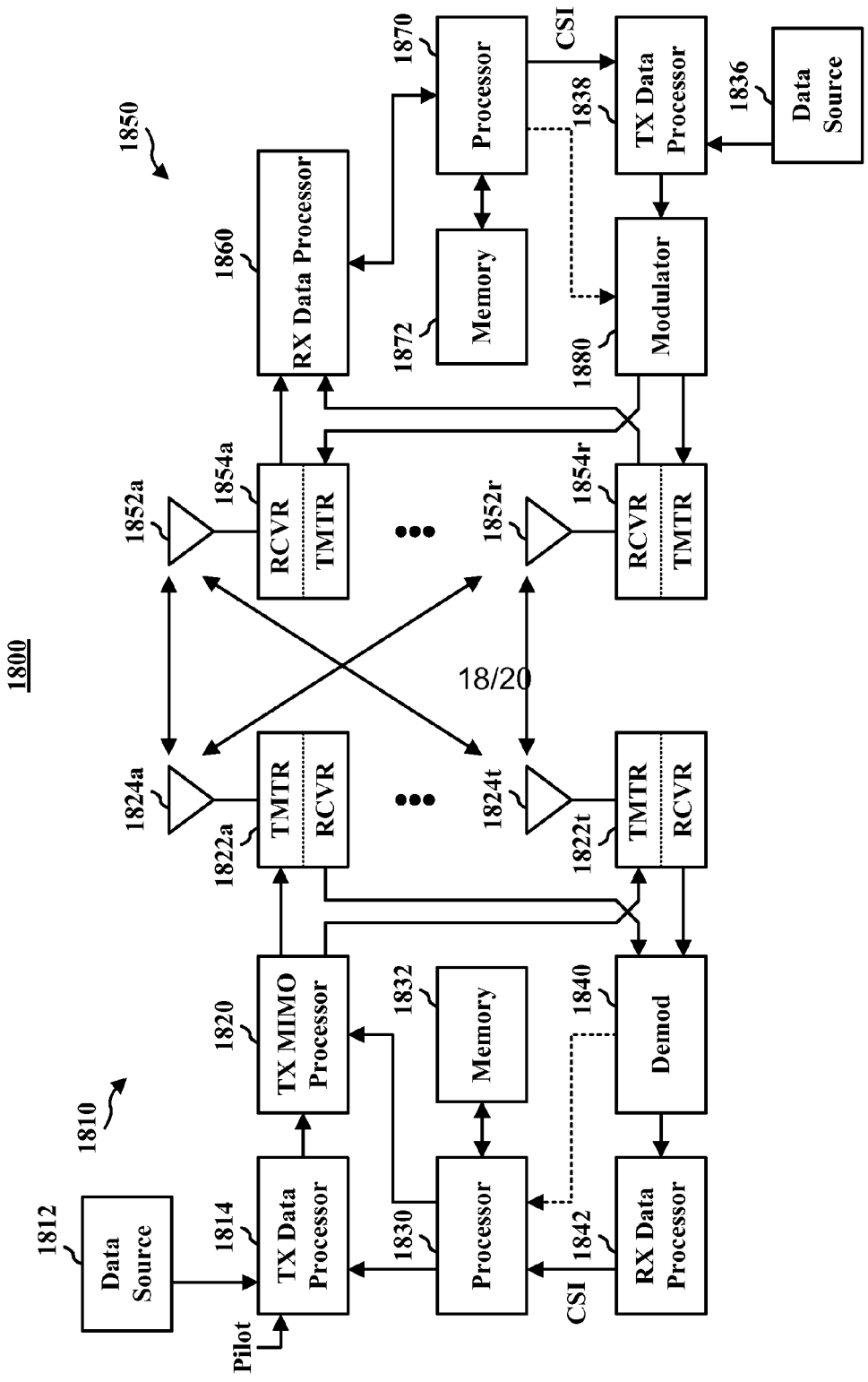
FIG. 18 illustrates a representative wireless communication system in accordance with at least one aspect disclosed herein.

FIG. 18 shows an example wireless communication system 1800. The wireless communication system 1800 depicts one base station 1810 and one mobile device 1850 for sake of brevity. However, it is to be appreciated that system 1800 can include more than one base station and/or more than one mobile device, wherein additional base stations and/or mobile devices can be substantially similar or different from example base station 1810 and mobile device 1850 described below. In addition, it is to be appreciated that base station 1810 and/or mobile device 1850 can employ the systems (FIGS. 1-11 and 16-17) and/or methods (FIGS. 12-15) described herein to facilitate wireless communication there between.

At base station 1810, traffic data for a number of data streams is provided from a data source 1812 to a transmit (TX) data processor 1814. According to an example, each data stream can be transmitted over a respective antenna. TX data processor 1814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1830.

The modulation symbols for the data streams can be provided to a TX MIMO processor 1820, which can further process the modulation symbols (e.g., for OFDM). TX MIMO processor 1820 then provides NT modulation symbol streams to NT transmitters (TMTR) 1822a through 1822t. In various embodiments, TX MIMO processor 1820 applies beamforming weights to the symbols of the data streams and to the antenna from which the symbol is being transmitted.

Each transmitter 1822 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1822a through 1822t are transmitted from NT antennas 1824a through 1824t, respectively.

At mobile device 1850, the transmitted modulated signals are received by NR antennas 1852a through 1852r and the received signal from each antenna 1852 is provided to a respective receiver (RCVR) 1854a through 1854r. Each receiver 1854 conditions (e.g., filters, amplifies, and downconverts) a respective signal, digitizes the conditioned signal to provide samples, and further processes the samples to provide a corresponding "received" symbol stream.

An RX data processor 1860 can receive and process the NR received symbol streams from NR receivers 1854 based on a particular receiver processing technique to provide NT "detected" symbol streams. RX data processor 1860 can demodulate, deinterleave, and decode each detected symbol stream to recover the traffic data for the data stream. The processing by RX data processor 1860 is complementary to that performed by TX MIMO processor 1820 and TX data processor 1814 at base station 1810.

A processor 1870 can periodically determine which preceding matrix to utilize as discussed above. Further, processor 1870 can formulate a reverse link message comprising a matrix index portion and a rank value portion.

The reverse link message can comprise various types of information regarding the communication link and/or the received data stream. The reverse link message can be processed by a TX data processor 1838, which also receives traffic data for a number of data streams from a data source 1836, modulated by a modulator 1880, conditioned by transmitters 1854a through 1854r, and transmitted back to base station 1810.

At base station 1810, the modulated signals from mobile device 1850 are received by antennas 1824, conditioned by receivers 1822, demodulated by a demodulator 1840, and processed by a RX data processor 1842 to extract the reverse link message transmitted by mobile device 1850. Further, processor 1830 can process the extracted message to determine which preceding matrix to use for determining the beamforming weights.

Processors 1830 and 1870 can direct (e.g., control, coordinate, manage, etc.) operation at base station 1810 and mobile device 1850, respectively. Respective processors 1830 and 1870 can be associated with memory 1832 and 1872 that store program codes and data. Processors 1830 and 1870 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents.

Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 19:
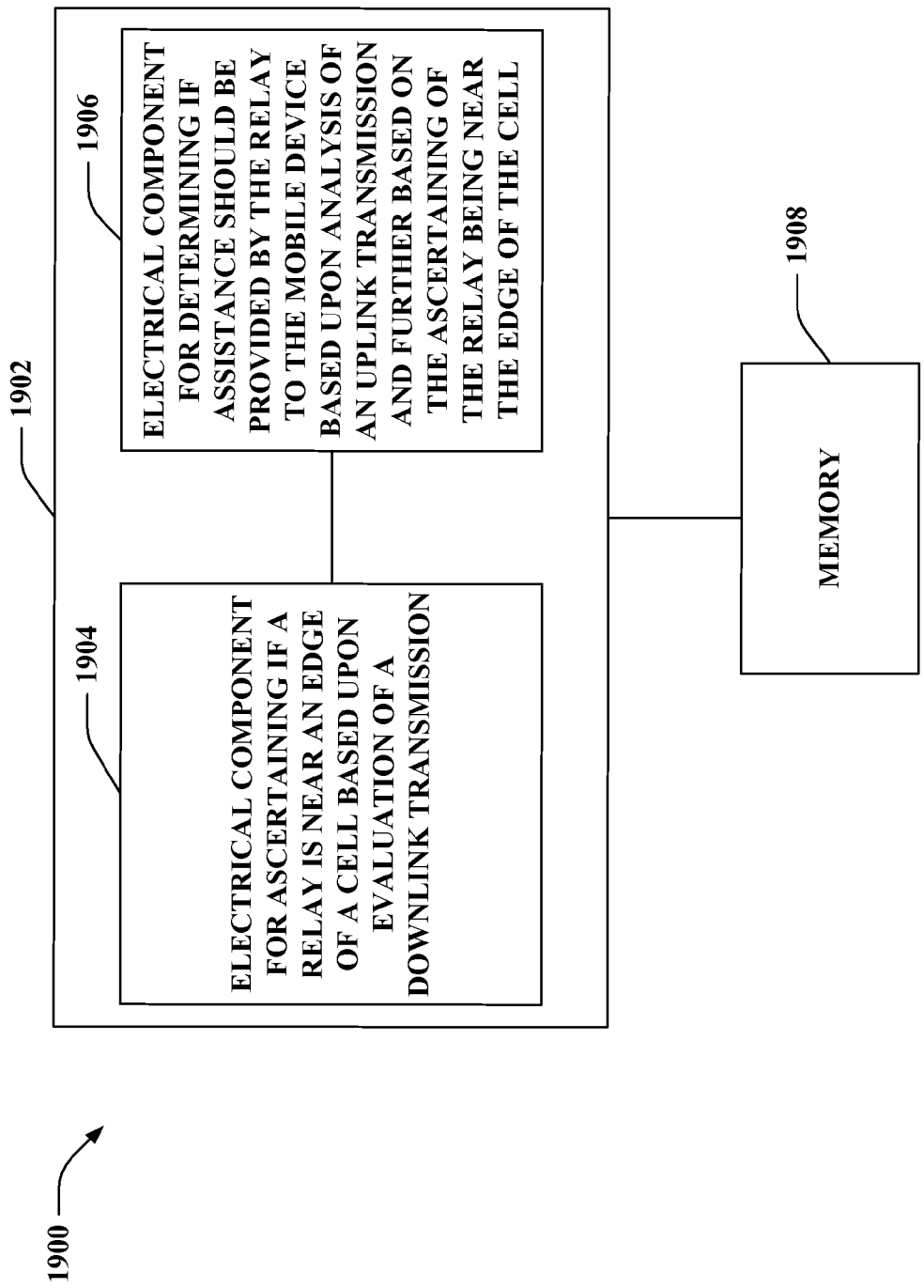
FIG. 19 illustrates a representative system for determining if relay assistance should be provided in accordance with at least one aspect disclosed herein.

With reference to FIG. 19, illustrated is a system 1900 that determines if relay assistance is appropriate. For example, system 1900 can reside at least partially within a mobile device. It is to be appreciated that system 1900 is represented as including functional blocks, which can be functional blocks that represent functions implemented by a processor, software, or combination thereof (e.g., firmware). System 1900 includes a logical grouping 1902 of electrical components that can facilitate operation. For instance, logical grouping 1902 can include electrical component for ascertaining if a relay is near an edge of a cell based upon evaluation of a downlink transmission 1904 and/or electrical component for determining if assistance should be provided by the relay to the mobile device based upon analysis of an uplink transmission and further based on the ascertaining of the relay being near the edge of the cell. Additionally, system 1900 can include a memory 1908 that retains instructions for executing functions associated with electrical components 1904 and 1906. While shown as being external to memory 1908, it is to be understood that one or more of electrical components 1904 and 1906 can exist within memory 1908.

Figure 20:
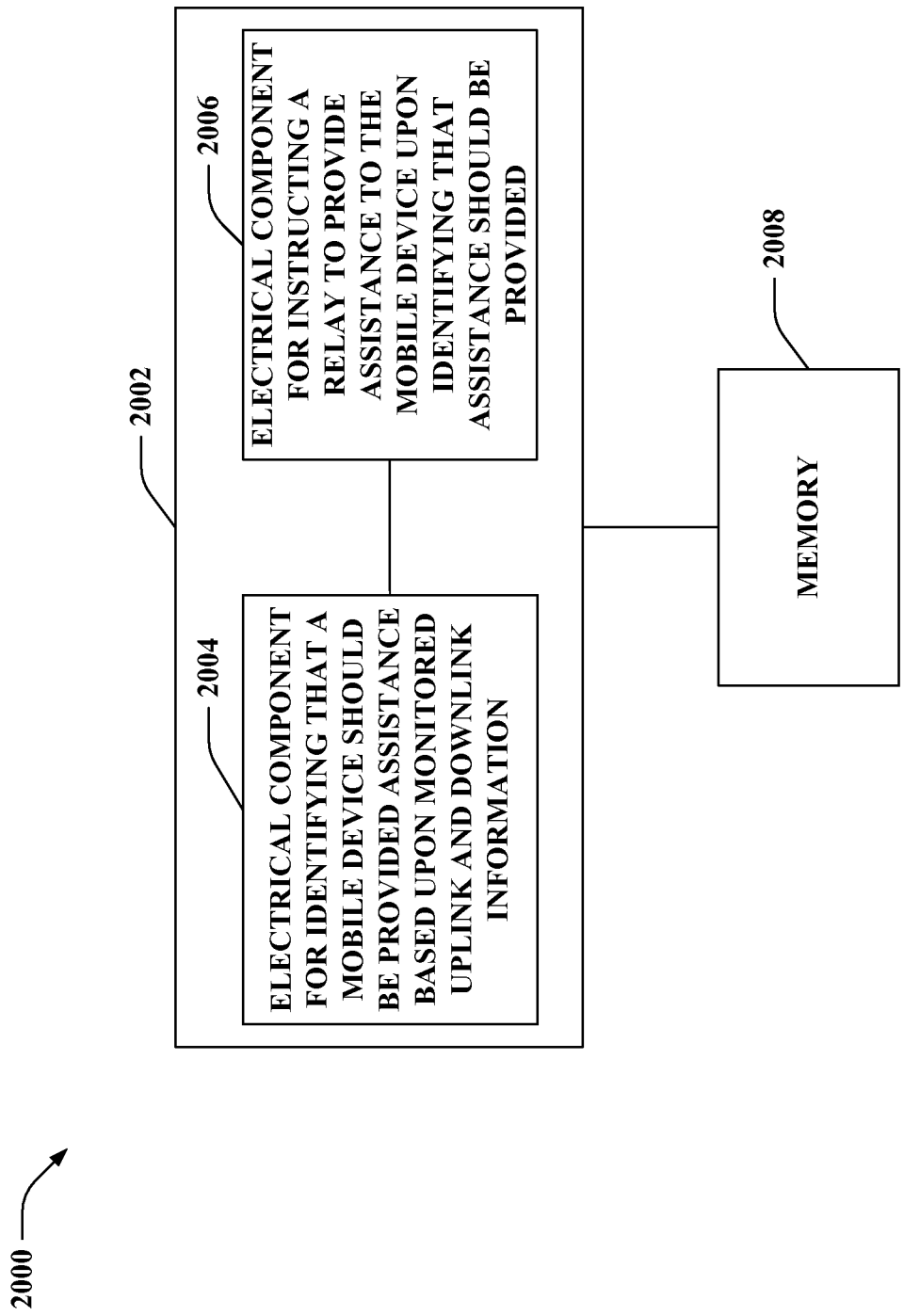
FIG. 20 illustrates a representative system for providing relay assistance in accordance with at least one aspect disclosed herein.

Turning to FIG. 20, illustrated is a system 2000 that provides relay assistance. System 2000 can reside within a base station, for instance. As depicted, system 2000 includes functional blocks that can represent functions implemented by a processor, software, or combination thereof (e.g., firmware). System 2000 includes a logical grouping 2002 of electrical components that can facilitate operation. Logical grouping 2002 can include electrical components for identifying that a mobile device should be provided assistance based upon monitored uplink and downlink information 2004. In addition, the logical grouping 2002 can include electrical components for instructing a relay to provide assistance to the mobile device upon identifying that assistance should be provided 2006. Additionally, system 2000 can include a memory 2008 that retains instructions for executing functions associated with electrical components 2004 and 2006. While shown as being external to memory 2008, it is to be understood that electrical components 2004 and 2006 can exist within memory 2008.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for determining whether assistance should be provided to a mobile device operable upon a wireless communication device, comprising:
   ascertaining if a relay is near an edge of a cell, the cell provided by a base station and serving the mobile device, based upon evaluation of a downlink transmission;
   determining if assistance should be provided by the relay to the mobile device based upon analysis of an uplink transmission and a battery condition of the mobile device, and further based upon the ascertaining of the relay being near the edge of the cell; and
   providing assistance based upon a positive determination that assistance should be provided, wherein the base station and the mobile device are unaware that relay assistance is being provided.

2. The method of claim 1, further comprising:
   monitoring the uplink transmission; and
   analyzing the monitored uplink transmission, a result of the analysis being used in making the determination.

3. The method of claim 1, further comprising monitoring power capability of the mobile device, wherein the power capability is used in determining if assistance should be provided by the relay to the mobile device.

4. The method of claim 1, wherein a threshold level is used to determine if assistance should be provided by the relay to the mobile device.

5. The method of claim 1, further comprising setting a threshold level, said setting being performed through comparing a data rate transmission of the mobile device against a signal-to-interference ratio of the data rate transmission.

6. The method of claim 1, further comprising resolving how to support the mobile device, the assistance being provided in accordance with a result of the resolution.

7. The method of claim 1, further comprising:
   monitoring the downlink transmission; and
   evaluating the monitored downlink transmission, wherein a result of the evaluation is used in ascertaining if the relay is near the edge of the cell.

8. The method of claim 7, wherein monitoring the downlink transmission comprises decoding downlink control information.

9. The method of claim 8, wherein the relay is a valid access terminal that is scheduled on an uplink when decoding downlink control information.

10. A wireless communication device, comprising:
    a memory that stores instructions related to:
    ascertaining if a relay is near an edge of a cell, the cell provided by a base station and serving a mobile device, based upon evaluation of a downlink transmission;
    determining if assistance should be provided by the relay to the mobile device based upon analysis of an uplink transmission and a battery condition of the mobile device, and further based upon the ascertaining of the relay being near the edge of the cell; and
    providing assistance based upon a positive determination that assistance should be provided, wherein the base station and the mobile device are unaware that relay assistance is being provided; and a processor coupled to the memory, configured to execute the instructions stored in the memory.

11. The wireless communication device of claim 10, further comprising instructions related to:
    monitoring the uplink transmission; and
    analyzing the monitored uplink transmission, a result of the analysis being used in making the determination.

12. The wireless communication device of claim 10, further comprising instructions related to monitoring power capability of the mobile device, the power capability being used in determining if assistance should be provided by the relay to the mobile device.

13. The wireless communication device of claim 10, a threshold level being used to determine if assistance should be provided by the relay to the mobile device.

14. The wireless communication device of claim 10, further comprising instructions related to setting a threshold through comparing a data rate transmission of the mobile device against a signal-to-interference ratio of the data rate transmission.

15. The wireless communication device of claim 10, further comprising instructions related to resolving how to support the mobile device, the assistance being provided in accordance with a result of the resolution.

16. The wireless communication device of claim 10, further comprising instructions related to:
    monitoring the downlink transmission; and
    evaluating the monitored downlink transmission, wherein a result of the evaluation is used in ascertaining if the relay is near the edge of the cell.

17. The wireless communication device of claim 16, further comprising instructions related to decoding downlink control information.

18. The wireless communication device of claim 17, wherein the relay is a valid access terminal that is scheduled on an uplink when decoding downlink control information.

19. A computer-program product, comprising:
    a non-transitory computer-readable medium comprising:
    a first set of codes for causing a computer to ascertain if a relay is near an edge of a cell, the cell provided by a base station and serving a mobile device, based upon evaluation of a downlink transmission;
    a second set of codes for causing the computer to determine if assistance should be provided by the relay to a mobile device based upon analysis of an uplink transmission and a battery condition of the mobile device, and further based upon the ascertaining of the relay being near the edge of the cell; and
    a third set of codes for causing the computer to provide assistance based upon a positive determination that assistance should be provided, wherein the base station and the mobile device are unaware that relay assistance is being provided.

20. An apparatus, comprising:
    means for ascertaining if a relay is near an edge of a cell, the cell provided by a base station and serving a mobile device, based upon evaluation of a downlink transmission;
    means for determining if assistance should be provided by the relay to a mobile device based upon analysis of an uplink transmission and a battery condition of the mobile device, and further based upon the ascertaining of the relay being near the edge of the cell; and
    means for providing assistance based upon a positive determination that assistance should be provided, wherein the base station and the mobile device are unaware that relay assistance is being provided.

21. A method for assisting communication of a mobile device operable upon a wireless communication device, comprising:
    identifying whether a mobile device should be provided assistance based upon monitored uplink and downlink information and a battery condition of the mobile device;

identifying whether a relay is at or near an edge of a cell, the cell provided by a related base station and serving the mobile device; and when the relay is at or near the edge of the cell, instructing the relay to provide assistance to the mobile device upon identifying that assistance should be provided;

wherein the related base station and the mobile device are unaware that relay assistance is being provided.

22. The method of claim 21, the provided assistance being analog assistance.

23. The method of claim 22, wherein providing assistance to the mobile device further comprises retransmission of a delayed version of an access terminal signal used by the mobile device.

24. The method of claim 22, further comprising:
monitoring a downlink assignment channel; and
determining a start time of an uplink transmission for the mobile device based upon the monitored downlink assignment channel.

25. The method of claim 22, further comprising:
monitoring an uplink communication of the mobile device; and
transmitting a scaled version of the uplink communication.

26. The method of claim 25, wherein monitoring and transmission occur upon one band.

27. The method of claim 22, further comprising determining a manner in which to assist the mobile device, the assistance being used by the relay and conveyed through the instruction.

28. The method of claim 27, further comprising selecting a transmit power of the relay, the selected transmit power being used in determining the manner of assistance.

29. The method of claim 21, the provided assistance being digital assistance, and wherein providing digital assistance further comprises:
intercepting a packet on a first communication from the mobile device to a base station; and
retransmitting the packet.

30. The method of claim 21, further comprising:
observing communication of the mobile device; and
analyzing a product of the observation, a result of the analysis being used in making the identification.

31. A wireless communication device, comprising:
a memory that stores instructions related to:
identifying whether a relay is at or near an edge of a cell;
a classifier module to identify whether a mobile device should be provided assistance based upon monitored uplink and downlink information and a battery condition of the mobile device; and
instructing, when the relay is at or near the edge of the cell, the cell provided by a related base station and serving the mobile device, the relay to provide assistance to the mobile device upon identifying that assistance should be provided;
wherein the related base station and the mobile device are unaware that relay assistance is being provided; and
a processor coupled to the memory, configured to execute the instructions stored in the memory.

32. The wireless communication device of claim 31, the provided assistance being analog assistance.

33. The wireless communication device of claim 32, further comprising instructions related to retransmitting a delayed version of an access terminal signal used by the mobile device.

34. The wireless communication device of claim 32, further comprising instructions related to:
monitoring a downlink assignment channel; and
determining a start time of an uplink transmission for the mobile device based upon the monitored downlink assignment channel.

35. The wireless communication device of claim 32, further comprising instructions related to:
monitoring an uplink communication of the mobile device; and
transmitting a scaled version of the uplink communication.

36. The wireless communication device of claim 35, wherein monitoring and transmitting occur upon one band.

37. The wireless communication device of claim 32, further comprising instructions related to determining a manner in which to assist the mobile device, the assistance being used by the relay and conveyed through the instruction.

38. The wireless communication device of claim 37, further comprising instructions related to selecting a transmit power of the relay, wherein the selected transmit power is used in determining the manner of assistance.

39. The wireless communication device of claim 31, the provided assistance being digital assistance, and wherein providing digital assistance further comprises:
intercepting a packet on a first communication from the mobile device to a base station; and
retransmitting the packet.

40. The wireless communication device of claim 31, further comprising instructions related to:
observing communication of the mobile device; and
analyzing a product of the observation, a result of the analysis being used in making the identification.

41. A computer-program product, comprising:
a non-transitory computer-readable medium comprising:
a first set of codes for causing a computer to identify that a mobile device should be provided assistance based upon monitored uplink and downlink information and a battery condition of the mobile device;
a second set of codes for identifying whether a relay is at or near an edge of a cell, the cell provided by a related base station and serving the mobile device; and
a third set of codes for causing the computer to instruct, when the relay is at or near the edge of the cell, the relay to provide assistance to the mobile device upon identifying that assistance should be provided;
wherein the related base station and the mobile device are unaware that relay assistance is being provided.

42. An apparatus, comprising:
means for identifying that a mobile device should be provided assistance based upon monitored uplink and downlink information and a battery condition of the mobile device;
means for identifying whether a relay is at or near an edge of a cell, the cell provided by a related base station and serving the mobile device; and
means for instructing, when the relay is at or near the edge of the cell, the relay to provide assistance to the mobile device upon identifying that assistance should be provided;
wherein the related base station and the mobile device are unaware that relay assistance is being provided.

* * * * *